(12) United States Patent
Lee

(10) Patent No.: US 6,763,070 B1
(45) Date of Patent: Jul. 13, 2004

(54) METHODS AND APPARATUS FOR SELECTING A CUT-OFF INDEX

(75) Inventor: Yuen-Wen Lee, Milpitas, CA (US)

(73) Assignee: Cisco Technology, Inc., San Jose, CA (US)

(*) Notice: Subject to any disclaimer, the term of this patent is extended or adjusted under 35 U.S.C. 154(b) by 205 days.

(21) Appl. No.: 09/870,177

(22) Filed: May 29, 2001

(51) Int. Cl.[7] .................................................. H04N 7/30
(52) U.S. Cl. ...................................................... 375/240.2
(58) Field of Search ....................... 348/400.1; 370/468; 375/240.01, 240.12, 240.18, 240.2, 240.24, 240.29; 382/100, 232, 236, 238, 248, 250, 251; H04N 7/12, 7/30

(56) References Cited

U.S. PATENT DOCUMENTS

| | | | | |
|---|---|---|---|---|
| 5,005,076 A | * | 4/1991 | Stroppina et al. | 348/400.1 |
| 6,002,801 A | * | 12/1999 | Strongin et al. | 375/240.18 |
| 6,181,711 B1 | * | 1/2001 | Zhang et al. | 370/468 |
| 6,236,749 B1 | * | 5/2001 | Satonaka et al. | 382/250 |
| 6,335,990 B1 | * | 1/2002 | Chen et al. | 375/240.29 |
| 6,359,999 B1 | * | 3/2002 | Moriwaki et al. | 382/100 |
| 6,516,096 B2 | * | 2/2003 | Yokose et al. | 382/248 |
| 6,556,624 B1 | * | 4/2003 | Orchard et al. | 375/240.12 |

OTHER PUBLICATIONS

G. Keesman, R. Hellinghuizen, F. Hoeksema, G. Heideman, "Transcoding of MPEG bitstreams", Signal Processing: Image Communication, vol. 8 (1996), pp. 481–500.

Brian C. Smith, "A Survey of Compressed Domain Processing Techniques," downloaded from www.uky.edu, Mar. 20, 2001, 10 pages.

Anthony Vero, "MPEG–4 Rate Control for Multiple Video Objects," *IEEE Transactions on Circuits and Systems for Video Technology*, vol. 9, No. 1, Feb. 1999, pp. 186–199.

* cited by examiner

*Primary Examiner*—Richard Lee
(74) *Attorney, Agent, or Firm*—Beyer Weaver & Thomas LLP

(57) ABSTRACT

Methods and apparatus are provided for selecting a cut-off index to filter transform coefficients associated with an input bitstream to provide filtered transform coefficients associated with a rescaled output bitstream. An arrangement of transform coefficients associated with an input data sequence (e.g. an audio segment or a video image block) is filtered using a cut-off index to provide modified transform coefficients associated with a modified output data sequence. Information including information about the input data sequence and the modified output data sequence can be used to update the filter cut-off index for reduction of future data sequences.

63 Claims, 15 Drawing Sheets

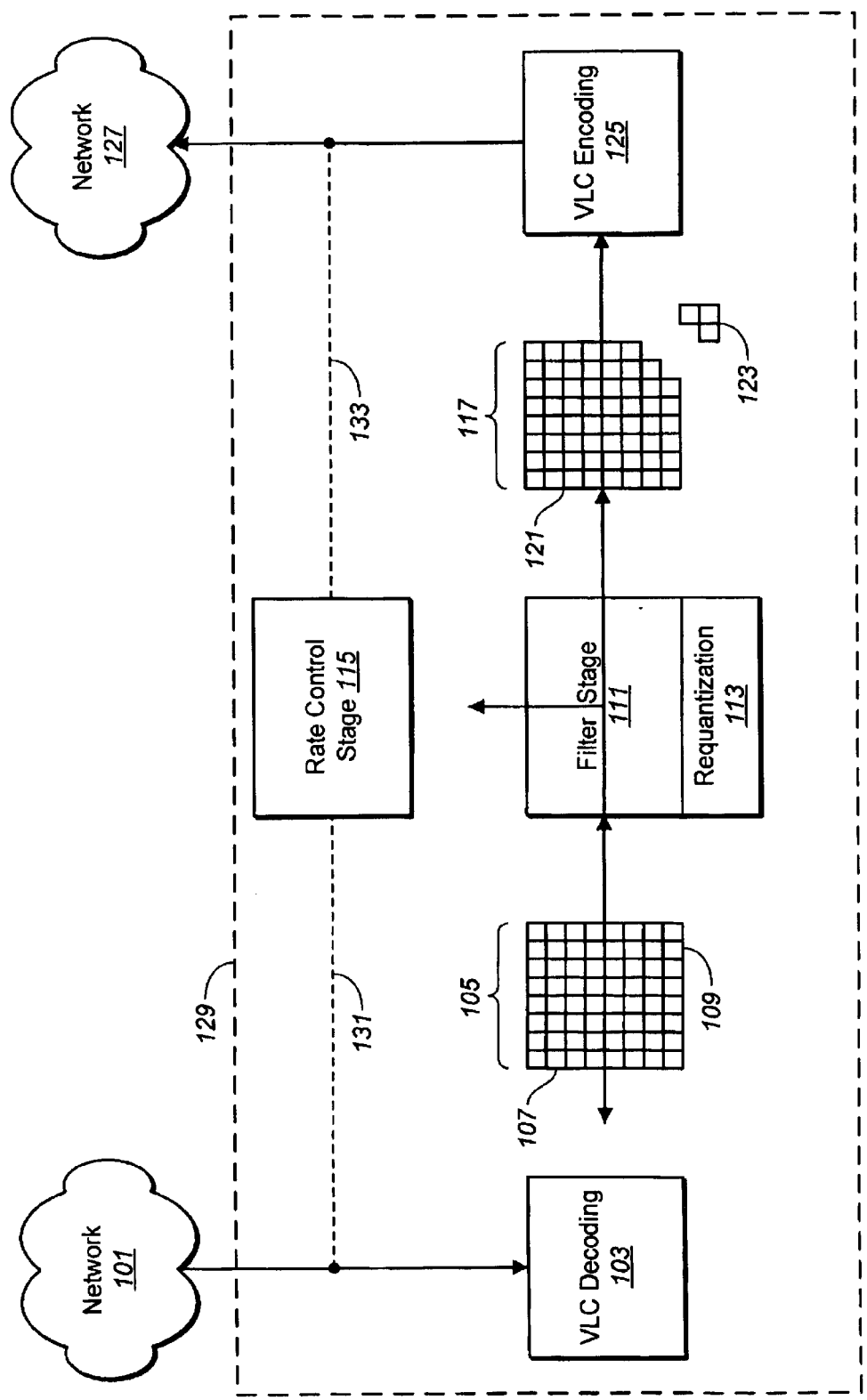
FIG._1

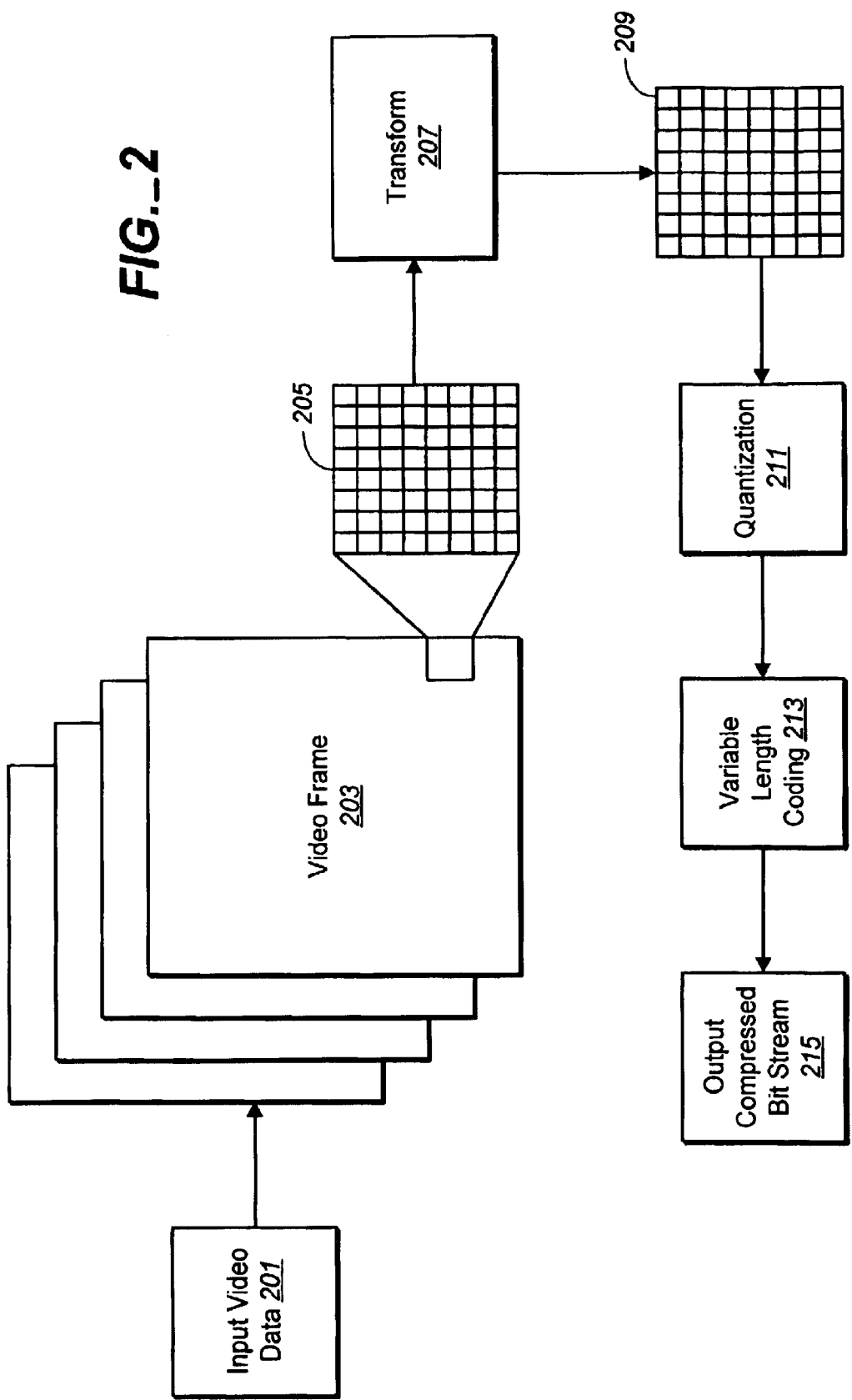

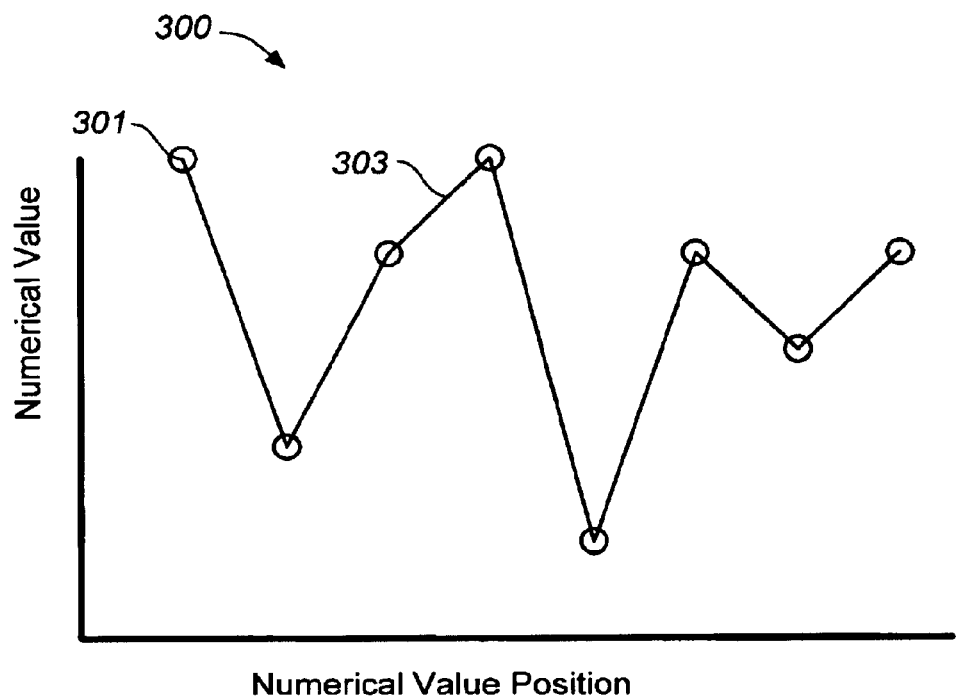
FIG._3A

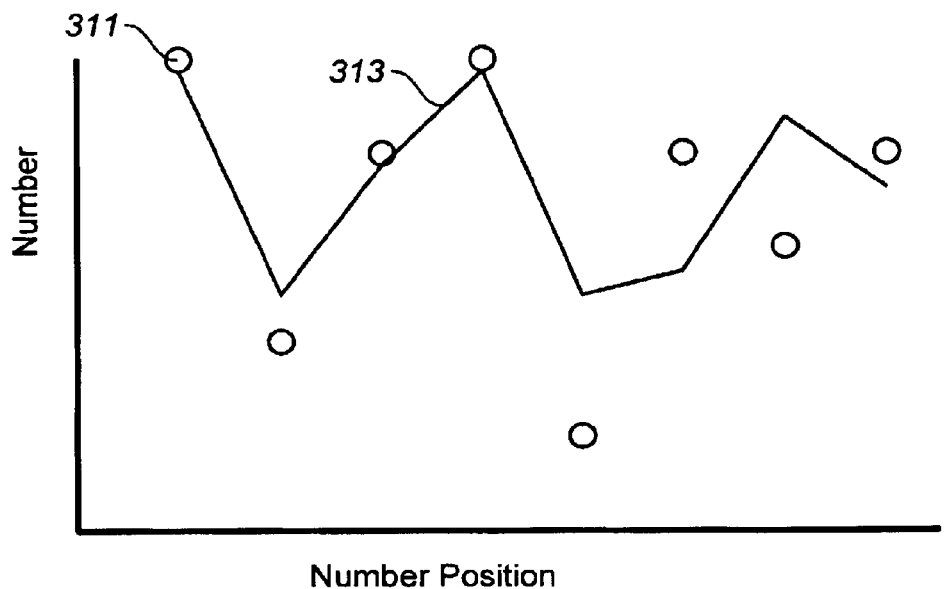
FIG._3B

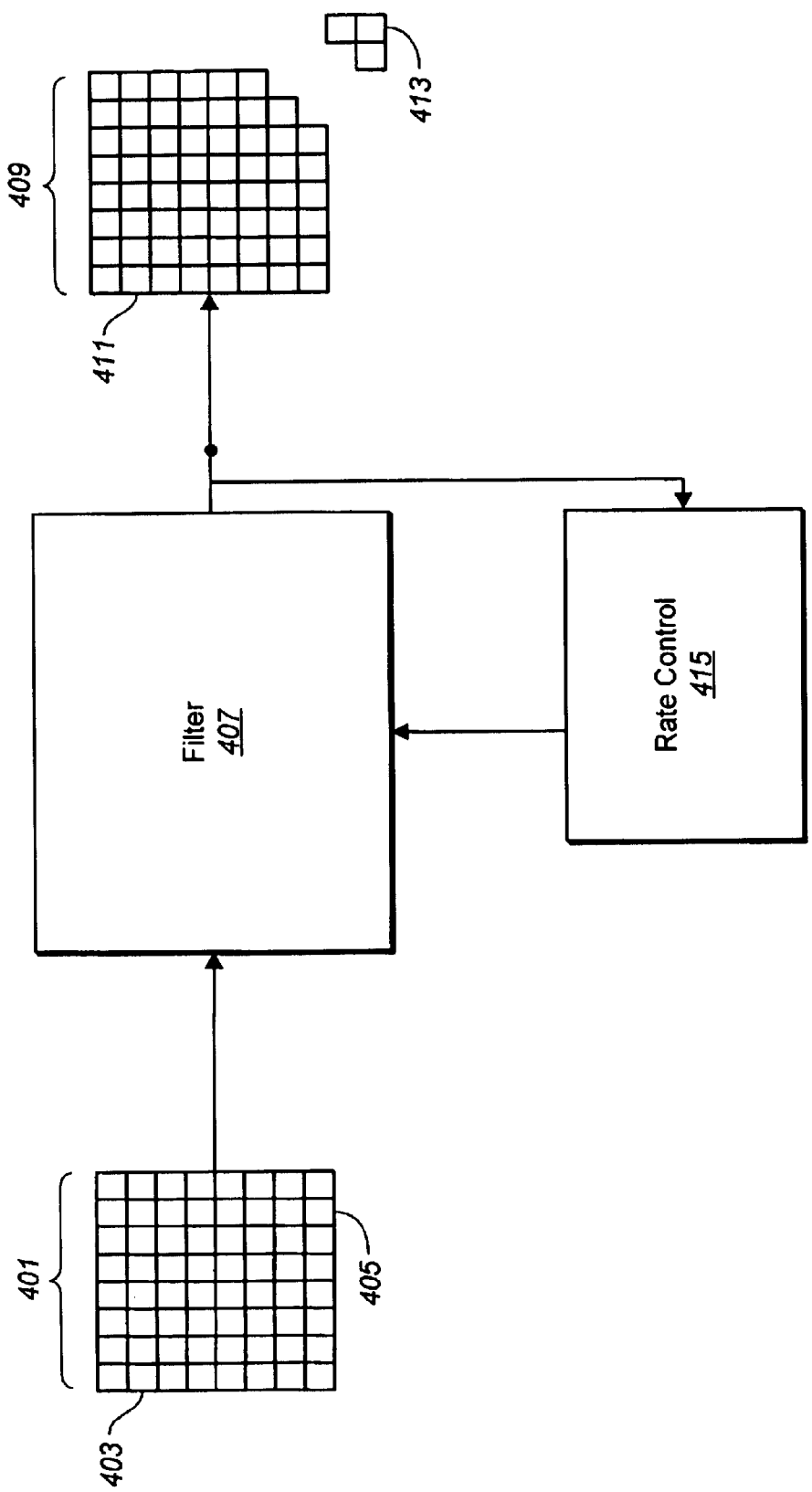
FIG._4

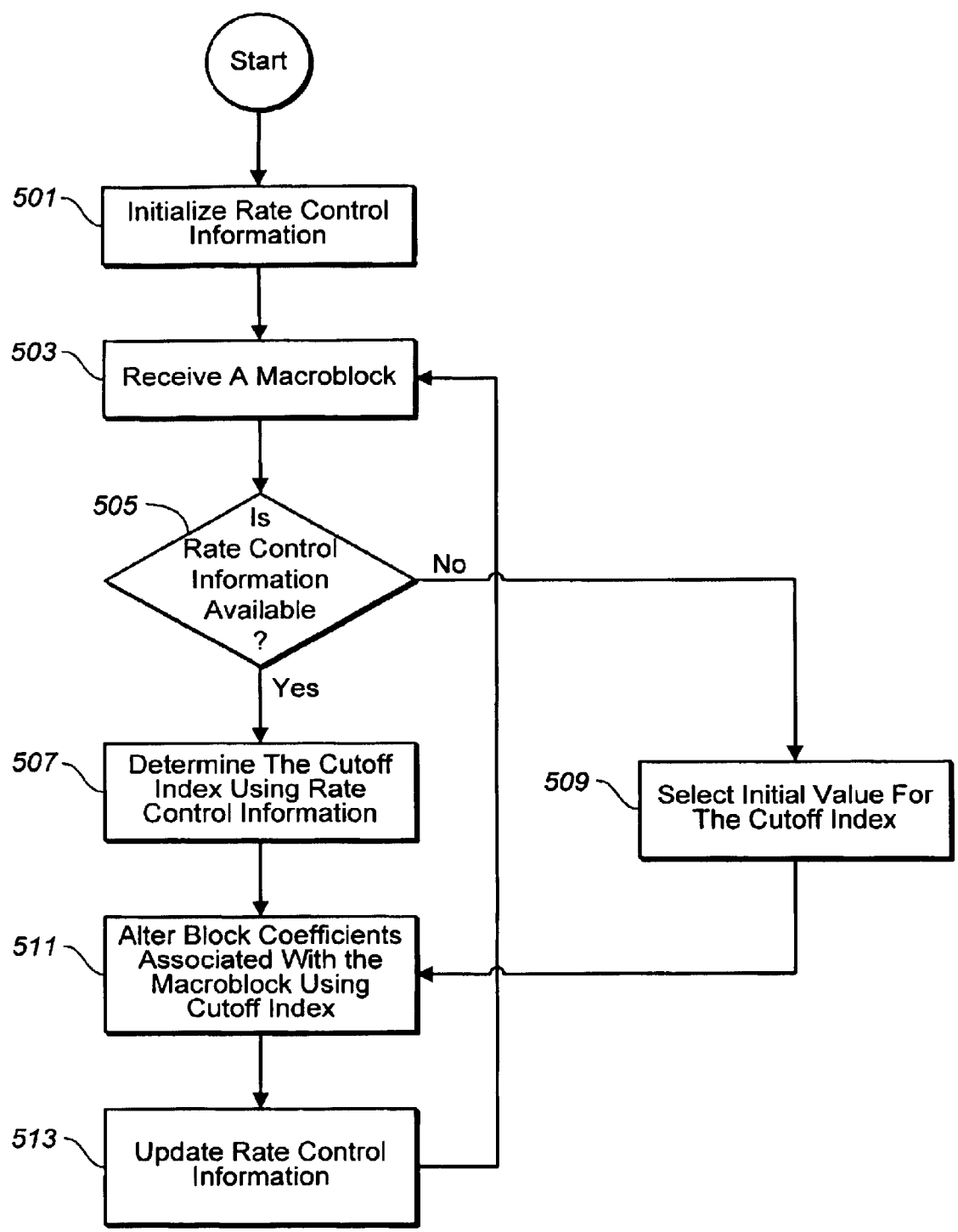
FIG._5

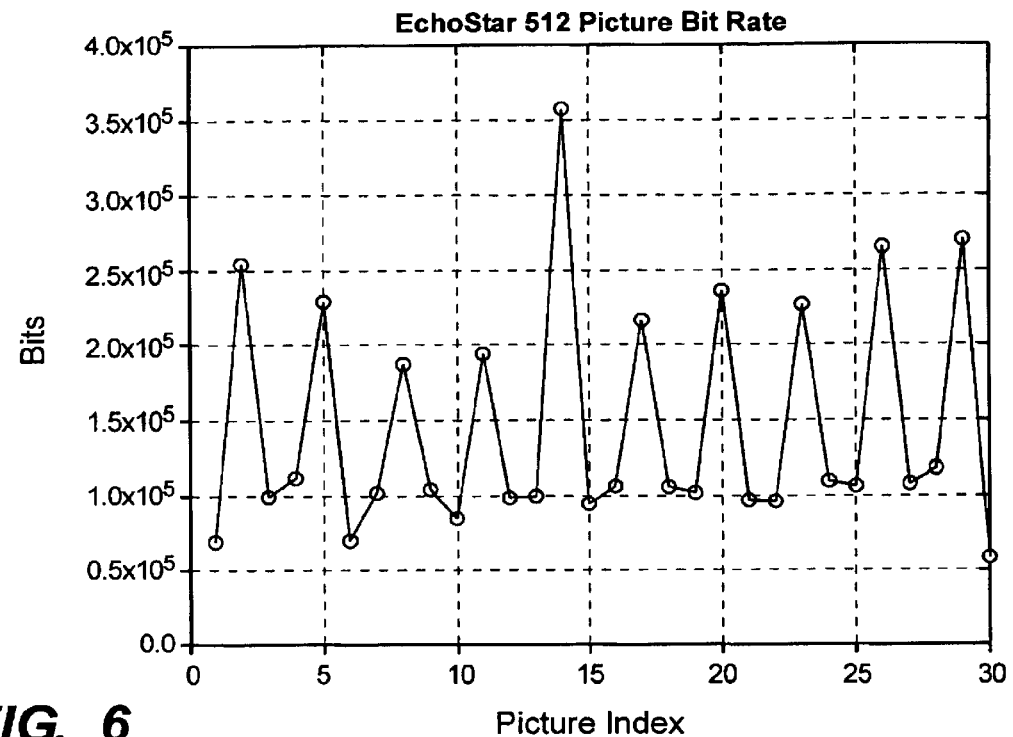
FIG. _6
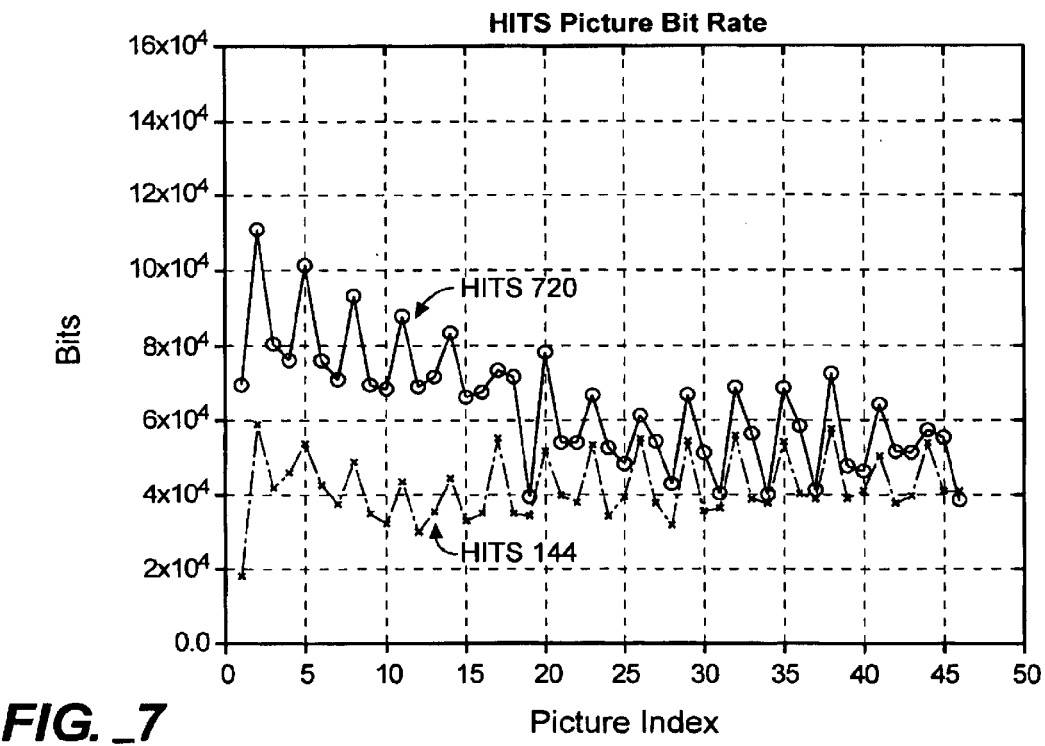
FIG. _7

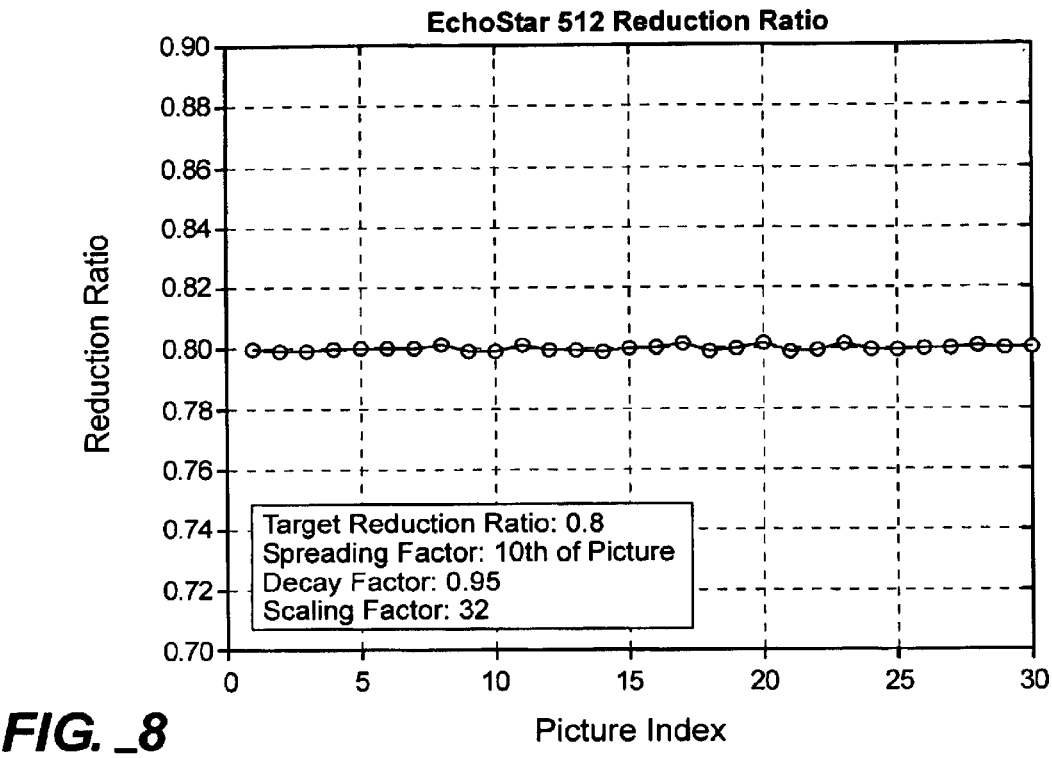
FIG. _8
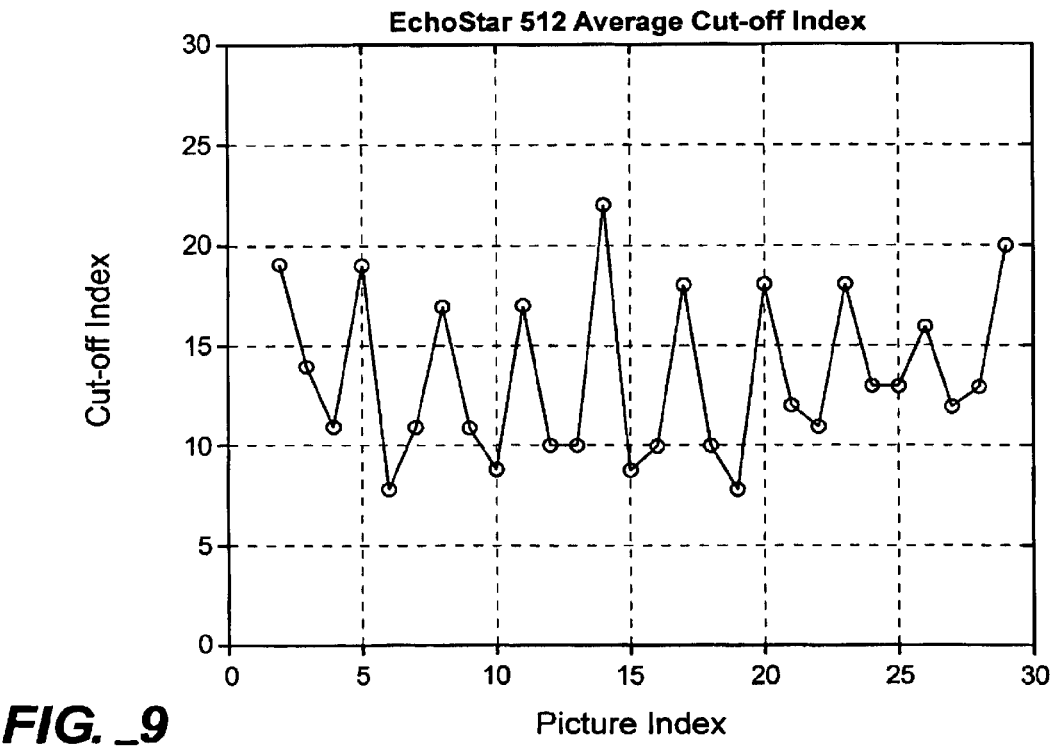
FIG. _9

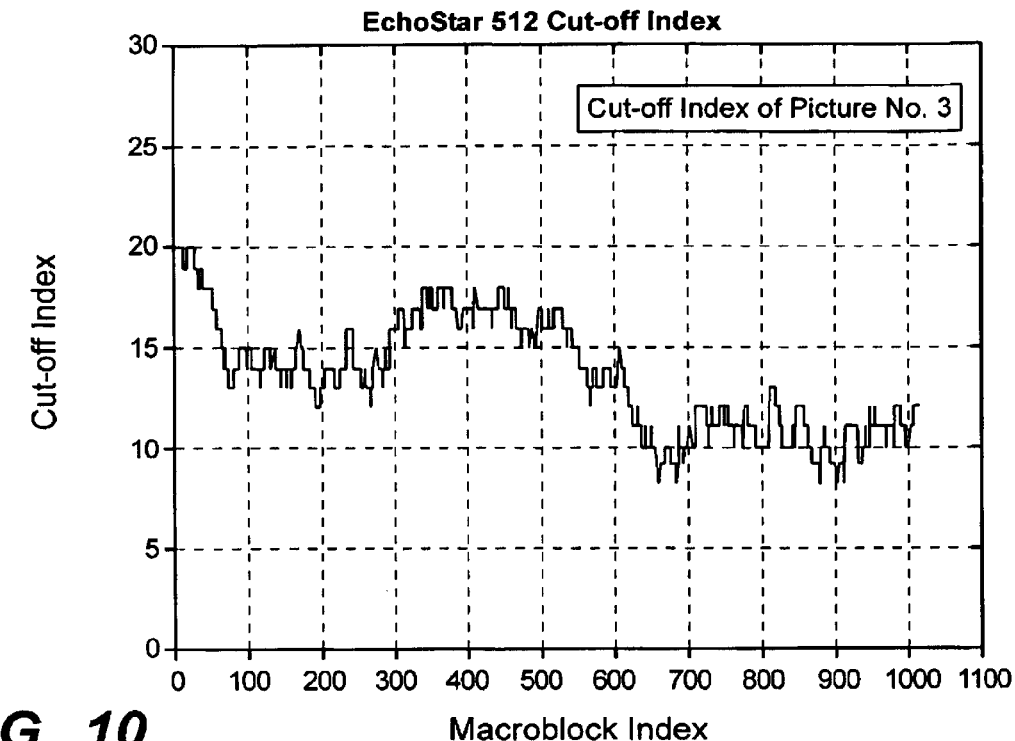
FIG. _10
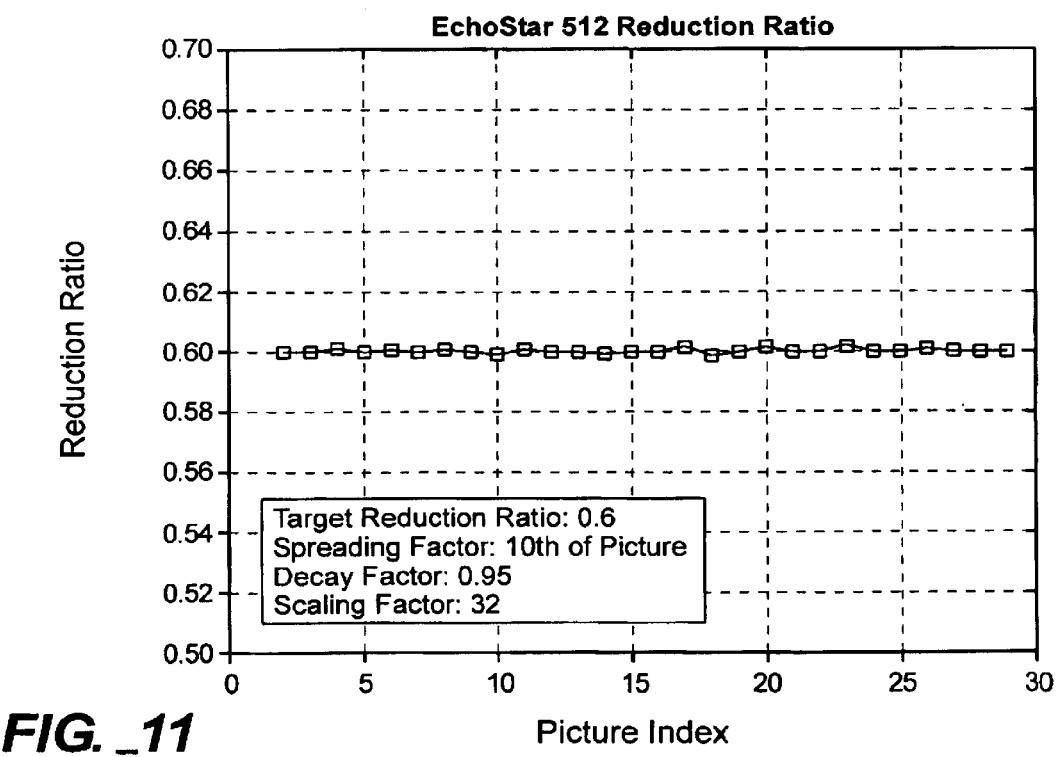
FIG. _11

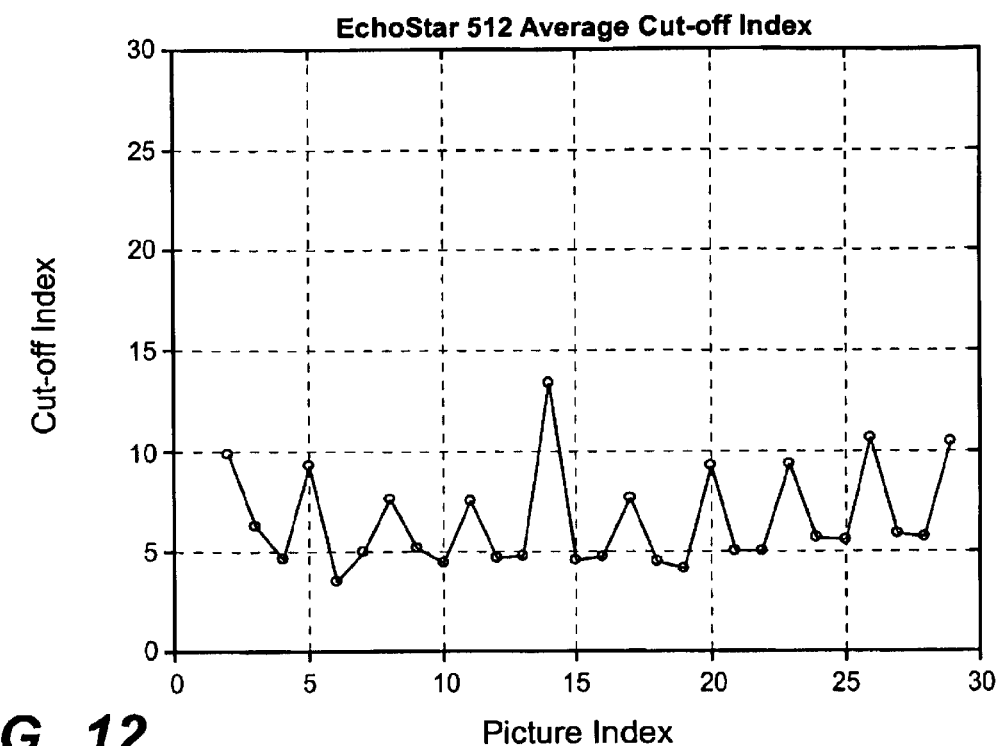
FIG._12
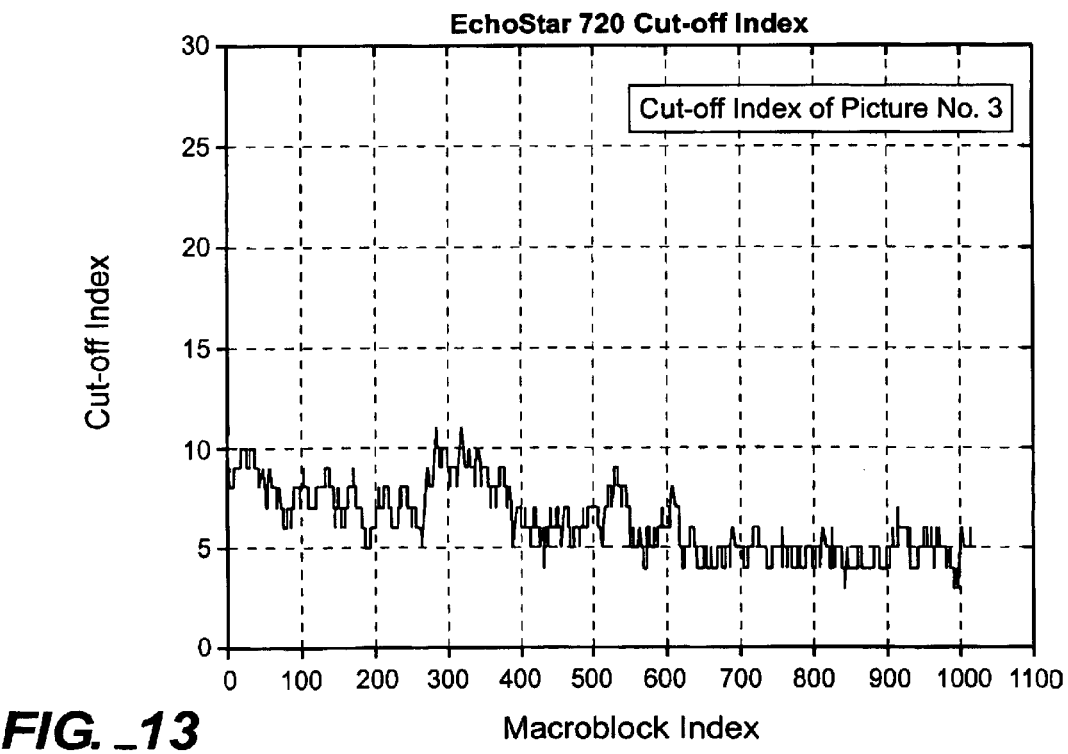
FIG._13

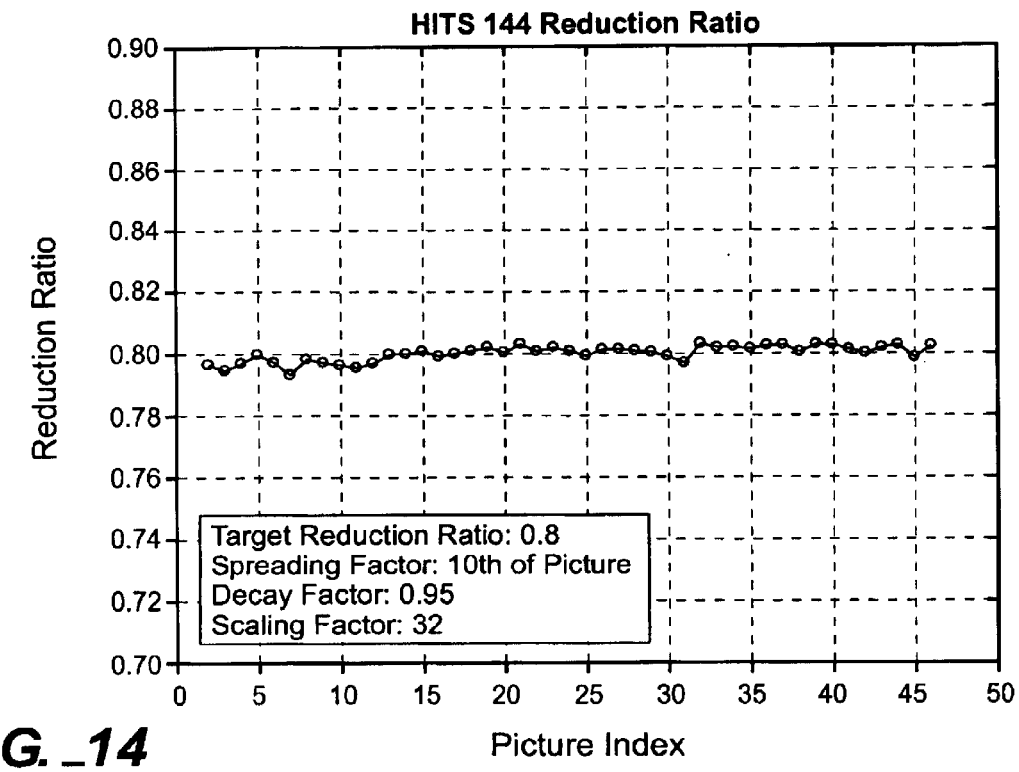
FIG. _14
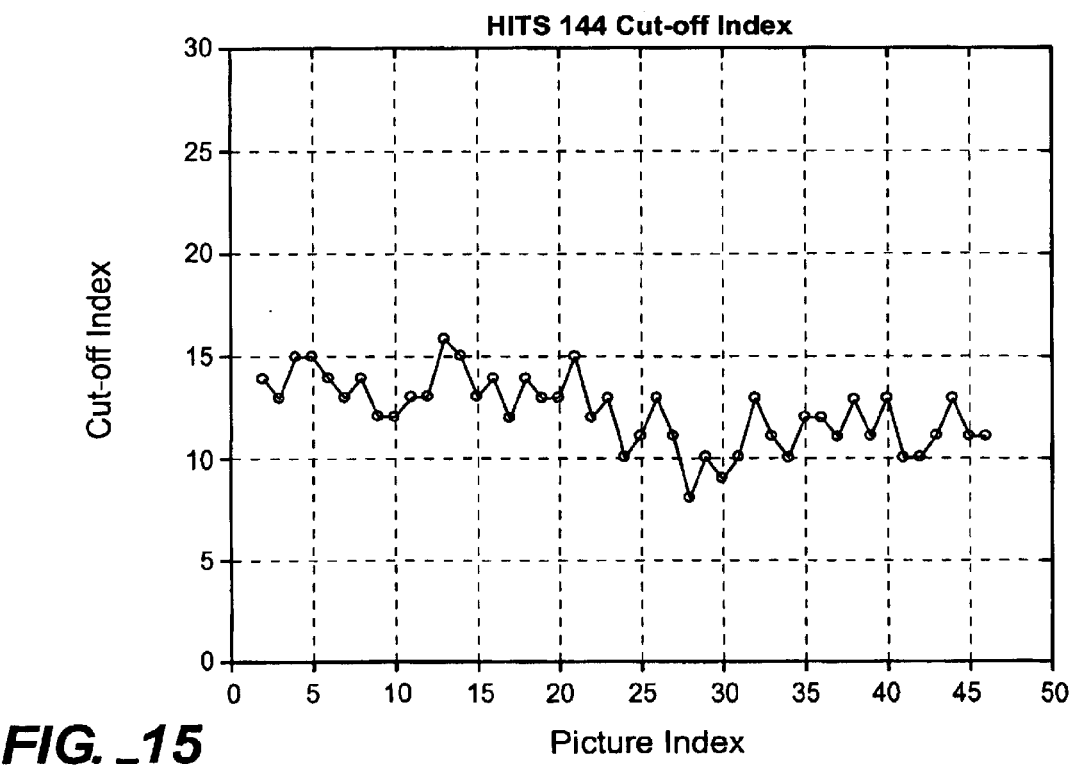
FIG. _15

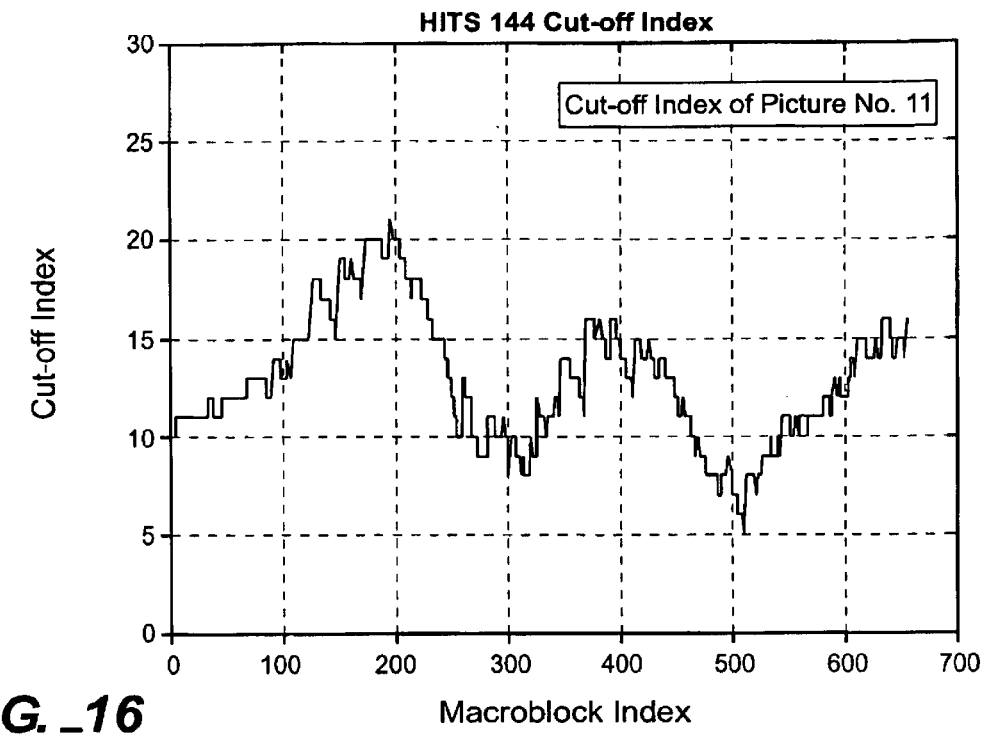
FIG. _16
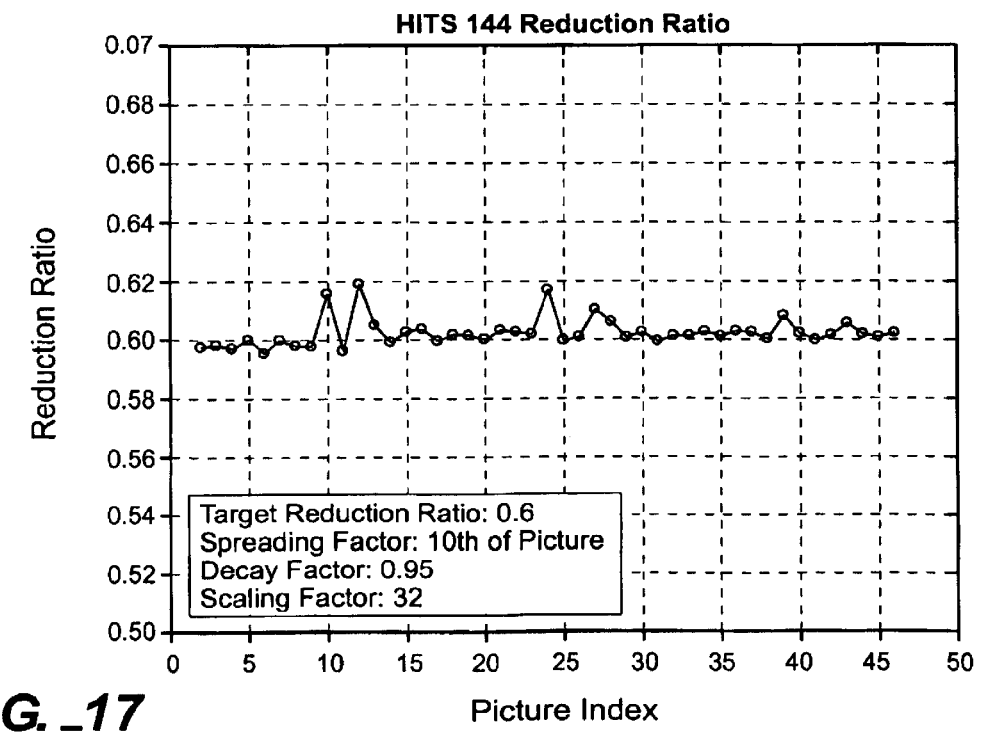
FIG. _17

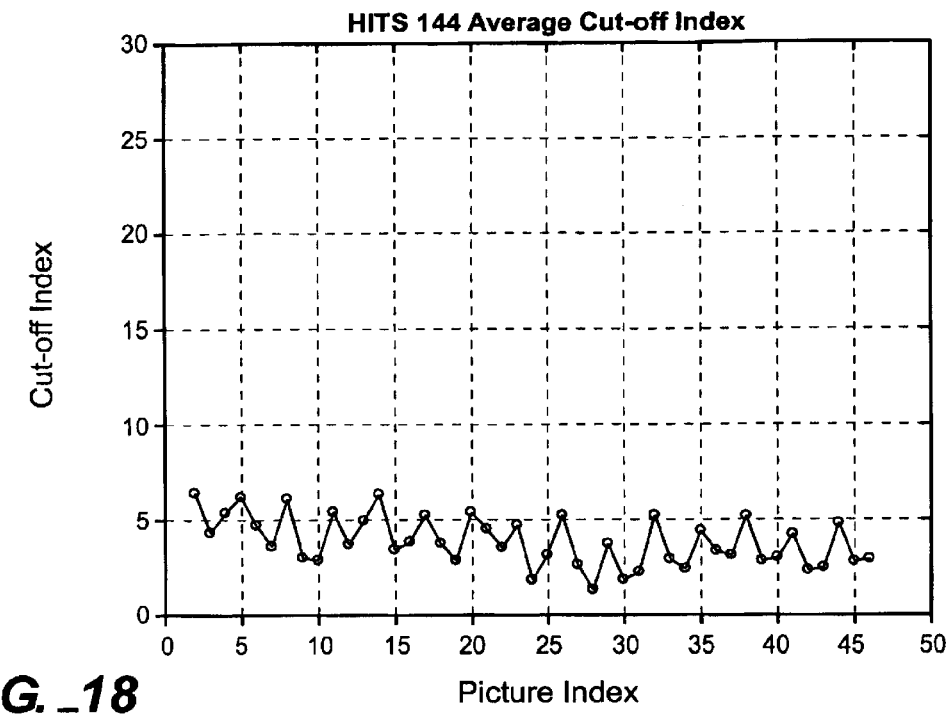
FIG. _18
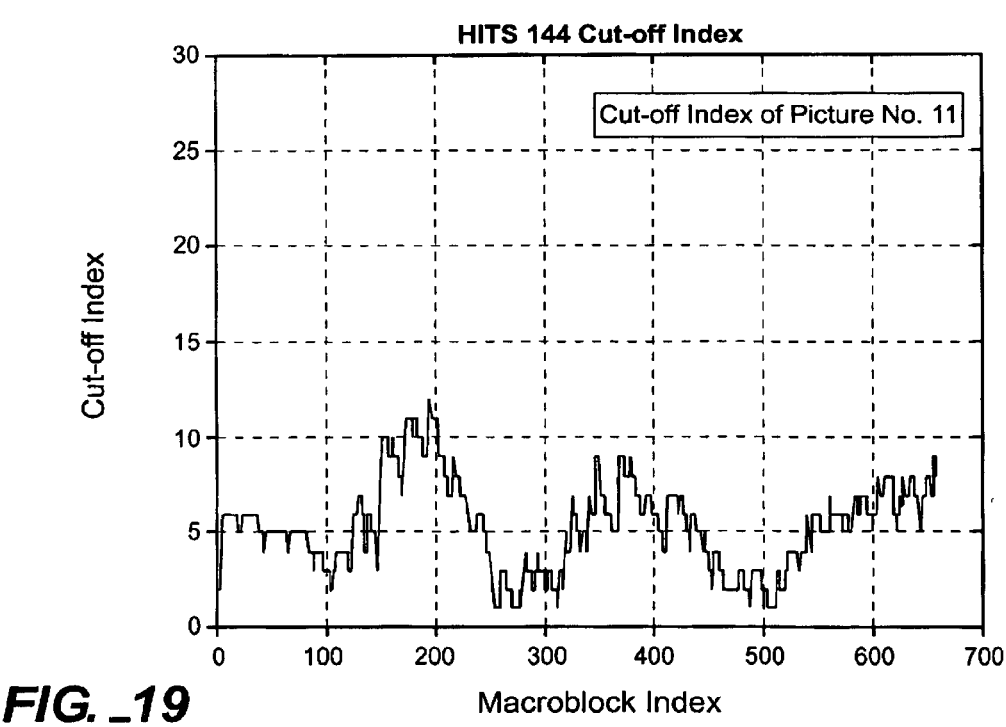
FIG. _19

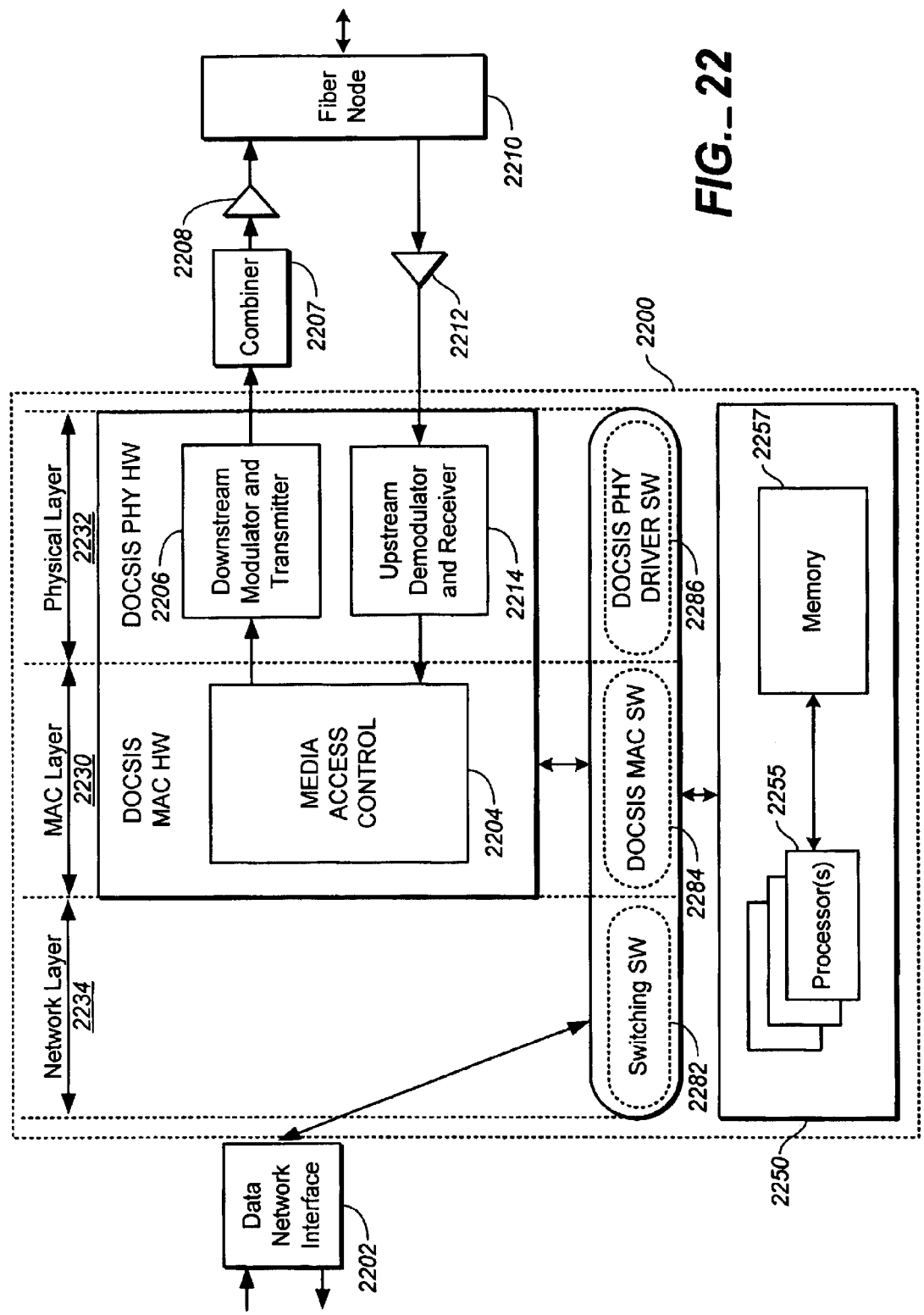
FIG._22

METHODS AND APPARATUS FOR SELECTING A CUT-OFF INDEX

CROSS-REFERENCE TO RELATED APPLICATIONS

The present application is related to U.S. patent application Ser. No. 09/867,966 by Wu et al., and titled Methods and Apparatus for Transform Coefficient Filtering and U.S. patent application Ser. No. 09/867,967 by Shen et al., and titled Methods and Apparatus for Updating a Reduction Ratio, both filed on the same day as the present application. Each of the above patent applications is incorporated herein by reference for all purposes.

BACKGROUND OF THE INVENTION

The present invention relates to rescaling data. More specifically, the present invention relates to filtering data to allow higher reduction ratios. Still more specifically, the present invention provides techniques for selecting a cut-off index to filter data based on transform coefficients.

Video data is one particularly relevant form of data that can benefit from improved techniques for rescaling. Video rescaling schemes allow digitized video frames to be represented digitally in an efficient manner. Rescaling digital video makes it practical to transmit the compressed signal by digital channels at a fraction of the bandwidth required to transmit the original signal without compression. Generally, compressing data or further compressing compressed data is referred to herein as rescaling data. International standards have been created on video compression schemes. International standards have been created on video compression schemes. The standards include MPEG-1, MPEG-2, MPEG-4, H.261, H.262, H.263, H.263+, etc. The standardized compression schemes mostly rely on several key algorithm schemes: motion compensated transform coding (for example, DCT transforms or wavelet/sub-band transforms), quantization of the transform coefficients, and variable length coding (VLC).

The motion compensated encoding removes the temporally redundant information inherent in video sequences. The transform coding enables orthogonal spatial frequency representation of spatial domain video signals. Quantization of the transformed coefficients reduces the number of levels required to represent a given digitized video sample and reduces bit usage in the compression output stream. The other factor contributing to rescaling is variable length coding (VLC) that represents frequently used symbols using code words. In general, the number of bits used to represent a given image determines the quality of the decoded picture. The more bits used to represent a given image, the better the image quality. The system that is used to compress digitized video sequence using the above described schemes is called an encoder or encoding system.

More specifically, motion compensation performs differential encoding of frames. Certain frames, such as I-frames in MPEG-2, continue to store the entire image, and are independent of other frames. Differential frames, such as B-frames or P-frames in MPEG-2, store motion vectors associated with the difference and coordinates of particular objects in the frames. The pixel-wise difference between objects is called the error term. In MPEG-2, P-frames reference a single frame while B-frames reference two different frames. Although this allows fairly high reduction ratios, motion compensation is limited when significant changes occur between frames. When significant changes occur between frames in a video sequence, a large number of frames are encoded as reference frames. That is, entire images and not just motion vectors are maintained in a large number of frames. This precludes high reduction ratios. Furthermore, motion compensation can be computationally expensive.

Each frame can be converted to luminance and chrominance components. As will be appreciated by one of skill in the art, the human eye is more sensitive to the luminance than to the chrominance of an image. In MPEG-2, luminance and chrominance frames are divided into 8×8 pixel blocks. The 8×8 pixel blocks are transformed using a discrete cosine transform (DCT) and scanned to create a DCT coefficient vector. Quantization involves dividing the DCT coefficients by a scaling factor. The divided coefficients can be rounded to the nearest integer. After quantization, some of the quantized elements become zero. The many levels represented by the transform coefficients are reduced to a smaller number of levels after quantization. With fewer levels represented, more sequences of numbers are similar. For example, the sequence 4.9 4.1 2.2 1.9 after division by two and rounding becomes 2 2 1 1. As will be described below, a sequence with more similar numbers can more easily be encoded using either arithmetic or Huffman coding. However, quantization is an irreversible process and hence introduces significant loss of information associated with the original frame or image.

Huffman or arithmetic coding takes the most common long sequences of numbers of bits and replaces them with a shorter sequence of numbers or bits. Again, Huffman or arithmetic coding is limited by common sequences of numbers or bits. Sequences that contain many different numbers are more difficult to encode.

Currently available compression techniques for rescaling data (e.g. video or audio) are limited in their ability to effectively compress data sequences for transmission across networks or storage on computer readable media. The available techniques also have significant limitations with respect to loss, computational expense, and delay. Various techniques for reducing the bit rate of compressed data sequences including audio and video streams are being developed. Some of the more promising approaches are described in U.S. Pat. No. 6,181,711 titled System And Method For Transporting A Compressed Video And Data Bitstream Over A Communication Channel. Other approaches are described in U.S. patent application Ser. No. 09/608,128 Methods And Apparatus For Bandwidth Scalable Transmission Of Compressed Video Data Through Resolution Conversion and U.S. patent application Ser. No. 09/766,020 titled Methods For Efficient Bandwidth and U.S. patent application Ser. No. 08/985,377 titled System And Method For Spatial Temporal-Filtering For Improving Compressed Digital Video Scaling Of Compressed Video Data. Each of these references is assigned to the assignee of this invention and is incorporated herein by reference for all purposes. It is still desirable to provide additional techniques for rescaling data that improve upon the limitations of the prior art.

SUMMARY OF THE INVENTION

According to the present invention, methods and apparatus are provided for selecting a cut-off index to filter transform coefficients associated with an input bitstream to provide filtered transform coefficients associated with a rescaled output bitstream. An arrangement of transform coefficients associated with an input data sequence (e.g. an audio segment or a video image block) is filtered using a cut-off index to provide modified transform coefficients associated with a modified output data sequence. Information including information about the input data sequence and the modified output data sequence can be used to update the filter cut-off index for reduction of future data sequences.

One aspect of the invention provides a method for reducing the bit rate of a video bitstream to meet bandwidth constraints. The method can be characterized as follows: identifying transform coefficients representing video content in a frame or a portion of frame of the video bitstream; identifying a cut-off index using rate control information; filtering selected transform coefficients from the video bitstream by using a cut-off index to thereby reduce the bit rate of the video bitstream.

The transform coefficients can be discrete cosine transform coefficients. The transform coefficients selected for filtering can be selected based upon their impact on human vision. Frequency considerations can be used for determining a cut-off index.

Another aspect of the invention pertains to a method for determining a cut-off index for a plurality of transform coefficients. The method can be characterized as follows: identifying a plurality of transform coefficients; identifying a cut-off index using rate control information; filtering the plurality of transform coefficients using the cut-off index to provide modified transform coefficients; adjusting the rate control information using information associated with transform coefficients and the modified transform coefficients.

Another aspect of the invention is an apparatus for filtering transform coefficients to provide modified transform coefficients. The apparatus can be characterized as follows: a filter stage for receiving transform coefficients, the filter stage associated with a cut-off index, wherein the filter stage selectively filters transform coefficients using the cut-off index; a rate control stage coupled to the output of the filter stage, the rate control stage providing feedback to the filter stage for adjusting the cut-off index using rate control information.

Another aspect of the invention pertains to computer program products including a machine readable medium on which is stored program instructions, tables or lists, and/or data structures for implementing a method as described above. Any of the methods, tables, or data structures of this invention may be represented as program instructions that can be provided on such computer readable media.

A further understanding of the nature and advantages of the present invention may be realized by reference to the remaining portions of the specification and the drawings.

BRIEF DESCRIPTION OF THE DRAWINGS

FIG. 1 is diagrammatic representation of a system that can use the techniques of the present invention.

FIG. 2 is a diagrammatic representation of another system that can use the techniques of the present invention.

FIGS. 3A and 3B are graphical representations of numbers, the DCT coefficients associated with the numbers, and the IDCT of the DCT coefficients.

FIG. 4 is a diagrammatic representation of a filter stage and a rate control stage, according to specific embodiments.

FIG. 5 is a process flow diagram showing techniques for selecting a cut-off index, according to specific embodiments.

FIGS. 6–21 are graphical representations of simulations used to determine preferred spreading, decaying, and scaling parameters.

FIG. 22 is a diagrammatic representation of a system that can be used to implement the techniques of the present invention.

DETAILED DESCRIPTION OF SPECIFIC EMBODIMENTS

Figure 20:
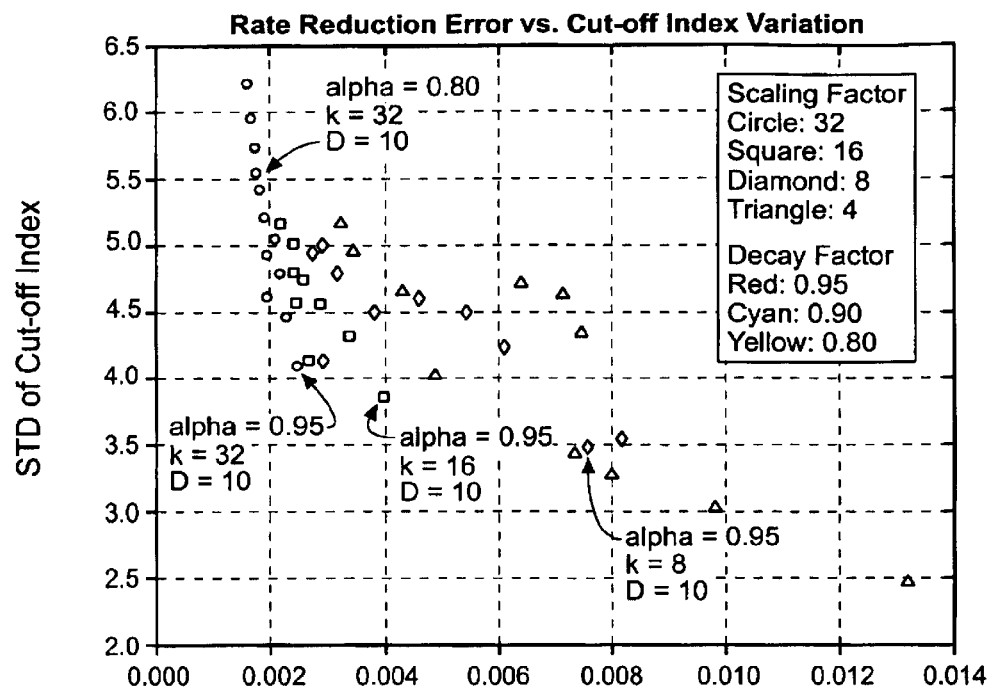

The present invention generally relates to data compression. Data compression techniques are described generally in *The Data Compression Book,* by Mark Nelson (ISBN: 1558514341), the entirety of which is hereby incorporated by reference for all purposes.

Many techniques for data compression are currently available. One particularly relevant technique for data compression is MPEG-2. MPEG-2 uses motion compensation, discrete cosine transforms, quantization, and variable length coding to rescale video data. Many prior art techniques have focused bit rate reduction and rescaling schemes on quantization, motion compensation, and variable length encoding. The present invention provides techniques for selectively filtering DCT coefficients to efficiently allow video compression to comply with desired reduction ratios while maintaining optimal perceivable image quality. More specifically, the present invention allows selective filtering of DCT coefficients associated with a macroblock to comply with reduction ratios by using rate control information derived from compression filtering and encoding of prior macroblocks.

FIG. 1 is a diagrammatic representation of a system 129 that can use the techniques of the present invention. FIG. 1 shows a system 129 that couples network 101 and network 127. According to various embodiments, network 101 has one set of constraints while network 127 has a more restrictive set of constraints. For example, network 101 may allow transmission at a higher bit rate than network 127. A system 129 receiving encoded content can reduce or rescale the content to allow transmission onto network 127. In one example, the bandwidth allocated on a network 101 to a particular user is 1 MBps while the bandwidth allocated for transmission on network 127 for the same user is 0.8 MBps. A real-time video stream transmitted from one network to another may benefit from improved techniques for rescaling the video stream to comply with the more restrictive constrains of network 127.

In common embodiments, system 129 can be a network device such as a gateway, router, switch, or cable modem headend connecting two different networks or networks having different network constraints. According to various embodiments, the encoded content is an MPEG bitstream. Note that the invention is not limited to an application to MPEG compression, or even the video compression techniques generally. Rather the invention is applicable to any type of content in which transform coefficients are used to represent portions of content. Furthermore, the coefficients can be selected based upon the type of untransformed content they represent (e.g. high frequency vs. low-frequency spatial features of an image or an audio sample).

For convenience, the invention will be described in the context of MPEG-2 compression and bit rate reduction in an MPEG-2 video stream. The size of an MPEG bitstream can be reduced by filtering the transform coefficients in each MPEG frame. A system 129 can then apply a reduction ratio of 0.8 to the encoded content by filtering coefficients. It should be noted that filtering includes altering coefficients, zeroing coefficients, setting a coefficient string to a particular sequence, or generally changing transform coefficients in block to allow an effective rescaling ratio. As will be appreciated by one of skill in the art, the bitstream is partially decoded before the transform coefficients are altered or filtered. The techniques of the present invention allow rescaling of a data sequence without complete decoding of the data sequence. According to various embodiments, rescaling the video stream does not involve computationally expensive inverse transform operations. Variable length decoding stage 103 receives the MPEG encoded bitstream and applies variable length decoding to extract a block 105. Block 105 typically represents a portion of a frame of MPEG video.

As will be appreciated by one of skill in the art, the basic structure for a coded video frame or picture is a block that is an 8 pixel by 8 pixel array. Multiple blocks, typically six to eight, form a macroblock, which in turn form part of a slice. A coded frame consists of multiple slices. Multiple coded frames form a group of frames. Such hierarchical layering of data structures localizes the most basic processing on the lowest layer, namely blocks and macroblocks.

As noted above, each block contains variable length codes for DCT coefficients. In the MPEG-2 syntax, the picture data section contains the bulk of the compressed video images. This is where the DCT coefficients are encoded as variable length codes. For a typical bitstream, this portion of the data takes somewhere between 70%–90% of the total bit usage of a coded picture, depending on the coded bit rate.

The access unit level information relates to coded pictures and may specify whether a picture is an intra frame (I-frame), a predicted frame (P-frame), or a bi-directional frame (B-frame). An I-frame contains full picture information. A P-frame is constructed using a past I-frame or P-frame. A bi-directional frame (B-frame) is bi-directionally constructed using both a past and a future I or P-frame. I-frames can be referred to as anchor frames.

Each video frame can be represented by luminance and chrominance pixels. The techniques of the present invention apply regardless of the type of frame or the type of pixel. Block 105 contains transform coefficients that roughly correspond to frequency information contained in the frame of MPEG video. Block 105 has low-frequency transform coefficients 107 and higher frequency transform coefficients 109. Although the transform coefficients of block 105 do not correspond exactly to frequency information contained in a portion of the frame of MPEG video, the coefficients provide general information on the various types of frequency information in the portion of the frame. Block 105 is passed to a filter stage 111. Filter stage 111 is optionally coupled with requantization stage 113. Both filtering at filter stage 111 and requantization at requantization stage 113 can be used to reduce the bandwidth requirements of the MPEG encoded bitstream. Filter stage 111 can be used to selectively filter transform coefficients.

According to various embodiments, filtering transform coefficients can comprise zeroing the transform coefficients or setting the transform coefficients to a particular sequence of numbers. In FIG. 1, transform coefficients 123 of block 117 are selected for filtering. Block 117 of modified transform coefficients comprises lower frequency transform coefficients 121 and higher frequency transform coefficients 123. Often frequency can be used as a filtering criteria for the coefficients. Of course, other criteria such as computational convenience, etc. can be used to select coefficients for filtering. Various selection and filtering criteria will be described further below.

Certain embodiments of the present invention select the higher frequency components 123 of the modified transform coefficient block 117 for filtering. Of course there may be other frequency selection criteria that can be used. Requantization stage 113 can also be used to zero transform coefficients 117 or to reduce the number of levels represented by a block 117. As will be appreciated by one of skill in the art, a block of modified transform coefficients 117 containing fewer levels and more zeroes can be efficiently variable length coded at VLC recoding stage 125. The modified transform coefficient block 117 can be encoded as a reduced output bitstream. The output bitstream can be provided to network 127.

Rate control stage 115 monitors the number of input bytes and the number of output bytes along lines 131 and 133 respectively. Rate control stage 115 can use information about the number of input and output bytes for prior filtered blocks of data to provide rate control information for a current block. Rate control information can be provided to filter stage 111 and to requantization stage 113 to allow control over rescaling. Information provided by rate control stage 115 can be used by filter stage 111 and requantization stage 113 to determine specifically how transform coefficients will be filtered. According to various embodiments rate control information is provided by rate control stage 115 for each macroblock.

As will be appreciated by one of skill in the art, each macroblock can comprise multiple component blocks. In MPEG-2, various formats may be employed to define the luminance and chrominance pixel content at a macroblock. Using the 4:2:0 format, a macroblock comprises four 8×8 matrices of luminance coefficients and two 8×8 matrices of chrominance coefficients. Rate control information can be updated at rate control stage 115 after a macroblock has been processed. Of course, other formats can use the techniques of the present invention. Alternatively, rate control stage 115 may provide rate control information to filter stage 111 and requantization stage 113 on a per frame or a per block basis.

Although that techniques of the present invention can be used in a network node connecting two networks having different bandwidth constraints, the techniques of the present invention are more general and can be applied in a variety of different contexts. For example, instead of receiving an MPEG encoded bitstream from a network 101, the MPEG encoded bitstream may be contained in a file that can be reduced in size prior to either storage, viewing, or transmission. System 129 can be used to reduce the size of a transform encoded file saved on a hard disk, CD, DVD, or other media. An MPEG encoded file can be variable length decoded at variable length decoding stage 103. A block 105 is forwarded to filter stage 111 and/or requantization stage 113 to provide a modified block 117.

According to various embodiments, a block of altered transform coefficients is then recoded at VLC encoding stage 125 and provided to output. A rate control stage 115 can provide rate control information to filter stage 111 and requantization stage 113 based on the desired file reduction size. Information can be provided to filter stage 111 and requantization stage 113 to allow a determination of how transform coefficients are altered or filtered. As noted above, rate control information can be provided for filtering on a per macroblock basis. In accordance with the techniques of the present invention, the inverse transform coding may be performed in a manner designed to meet a reduction ratio.

FIG. 2 is a diagrammatic representation of another system that can use the techniques of the present invention. FIG. 2 describes a system for using the techniques of the present invention to initially encode video content. Video data 201 is split into video frames 203. Each video frame 203 can be represented by luminance or chrominance pixels of the video frame. The video frames 203 can also represent various I-frames, B-frames, or P-frames. Although FIG. 2 is described in the context of video data, one of skill in the art will understand that the techniques of the present invention can be applied to other types of data such as simple image data (e.g. JPEG) or audio data. Each video frame 203 can be divided into 16×16 pixel macroblocks. The macroblocks are further separated into component blocks of pixels. In the 4:2:0 format, a macroblock includes a 16×16 matrix of luminance pixels and two 8×8 matrices of chrominance pixels.

Block 205 can represent 64 pixels of image data. A transform stage 207 is applied to the block 205. According to specific embodiments, the transform stage 207 is a discrete cosine transform (DCT). Using the 4:2:0 format, the DCT operation produces four 8×8 blocks of coefficients derived from the luminance components of the macroblock and two 8×8 blocks of coefficients for each chrominance component of the macroblock. The transform stage converts block 205 representing pixel information to block 209 containing DCT coefficients. Using the techniques of the present invention, DCT transform stage 207 contains mechanisms for selectively filtering DCT coefficients. The transform stage 207 can contain mechanisms for selecting how and how many DCT coefficients to filter in order to obtain desired rescaling ratios. According to various embodiments, the coefficient filtering occurs for blocks regardless of whether the block is derived from an I-frame, B-frame, P-frame, chrominance, or luminance information. In the case of B and P-frames, coefficient filtering is applied to only the error components of the macroblocks. Of course, in MPEG, these are the only components that contain DCT coefficients. Accordingly, other types of frames are contemplated.

As will be appreciated by one of skill in the art, the coefficients in the top left region of block 209 roughly correspond to low frequency components of block 205. The coefficients in the bottom right region of block 209 roughly correspond to high frequency components of block 205. The human eye is typically more sensitive to low frequency components than to high frequency components of an image. By removing low frequency components of an image, the edges and corners become more abrupt. By removing high frequency components of an image, the edges and corners tend to blur. By selectively filtering DCT coefficients of block 209, an image can be minimally altered while falling within bounds of a reduction ratio. The techniques of the present invention allow DCT coefficients to be selectively filtered in order to comply with reduction ratios.

The techniques of the present invention allow transform stage 207 to dynamically vary the number of DCT coefficients dropped based on the varying requirements of macroblock sequences. For example, the first few macroblocks of a particular video frame may be particularly easy to compress. This may be due to the fact that the first few macroblocks contain mostly uniform space. Quantization stage 211 and variable length coding 213 are able to compact the information associated with the first macroblocks into a small number of output bits in output bitstream 215. The target reduction ratio may seem easily achievable based on the first few macroblocks.

The transform stage 207 can then selectively filter fewer DCT coefficients. However, if the compression of prior macroblocks indicates that the total reduction ratio has not been achieved, transform stage 207 can filter more DCT coefficients. Filtering more DCT coefficients tends to decrease the number of bits in the output compressed bitstream 215.

As noted above, the DCT coefficients correspond to limited ranges of frequency information for the block 205. Often frequency can be used as a filtering criteria for the coefficients. Of course, other criteria such as computational convenience can be used to select coefficients based upon their contribution on human perception. As noted, the human eye is more sensitive to degradation of low-frequency spatial information than the degradation of higher frequency spatial information. Therefore, certain embodiments of this invention select the high frequency components of coefficient matrices for dropping. Of course there may be other frequency regimes that could be selected. In one embodiment, a system/method of this invention select particular frequency bands for filtering. Alternatively, for applications in edge and line detection, low-frequency components can be selected for filtering.

The DCT coefficients in block 209 are then quantized at 211. The quantized coefficients are variable length coded using Huffman or arithmetic coding at 213. MPEG typically uses Huffman coding. The output compressed bitstream is provided at 215.

Although the techniques of the present invention can be used in conjunction with all of the techniques described in FIG. 2, it should be noted that not all the techniques of FIG. 2 need to be used. For example, using the techniques of the present invention for selectively filtering DCT coefficients can allow quantization stage 211 to be avoided. Avoiding quantization can prevent irrecoverable loss of image information.

FIGS. 3A and 3B are graphical representations of information loss when DCT coefficients are selectively filtered. In FIG. 3A, numerical values 307 are represented in graph 300. The values may be pixel luminance values, for example. Numerical value 301 in the graph corresponds to numerical value 305 in the list. The DCT coefficients for numerical values 307 are DCT coefficients 309. The eight numbers shown in graph 300 are transformed into the eight DCT coefficients 309. Taking an inverse discrete cosine transform (IDCT) using the eight DCT coefficients 309 produces curve 303 in graph 300. It should be noted that all the information associated with numbers 307 is maintained. By using all the DCT coefficients, line 303 corresponds exactly with numbers 307 in graph 300.

In FIG. 3B, a DCT transform is applied to numerical values 317 to produce DCT coefficients. However, the two highest frequency DCT coefficients are filtered to yield DCT coefficients 319. As noted above, DCT coefficients can be filtered in order to comply with desired reduction ratios. Taking the IDCT using the six DCT coefficients 319 yields curve 313. It should be noted that the curve 313 does not correspond exactly with numerical values 317. Curve 313 somewhat approximates the original numbers 317. Accordingly, it is typically desirable to filter or alter as few DCT coefficients as possible.

Generally, the number of coefficients designated for filtering is referred to herein as the cut-off index. As will be appreciated by one of skill in the art, DCT coefficients roughly correspond to frequency components of a particular data sequence. The cut-off index can also be referenced as a cut-off frequency. That is, frequency components above or below a certain cut-off frequency may be selectively filtered. According to other embodiments multiple cut-off indices can be used. The DCT coefficients between two cut-off indices can be filtered. In the same way, DCT coefficients between several cut-off frequencies can be filtered. Multiple cut-off indices and cut-off frequencies can allow filtering of DCT coefficients that have the least perceivable effect on the original data sequence. Most fundamentally, a cut-off index represents a quantity of data that must be removed to meet some bandwidth or storage requirements.

FIG. 4 is a diagrammatic representation providing more detail on one implementation of the transform stage 207 of FIG. 2. A block 401 contains DCT coefficients. Block 401 typically results from the application of a DCT transform to an eight by eight pixel macroblock. Block 401 has low frequency components 403 and high frequency components 405 and is passed through a filter stage 407. A filter 407 can use a cut-off index to filter DCT coefficients. As noted above, the cut-off index can be represented as a cut-off frequency. More than one cut-off index or cut-off frequency can be used to selectively filter DCT coefficients. According to various embodiments filter 407 uses a cut-off index to selectively filter high frequency DCT coefficients of block 401.

According to various embodiments, filtering DCT coefficients can comprise zeroing the DCT coefficients, altering DCT coefficients, or setting the DCT coefficients to a particular sequence of numbers. The zeroing the DCT coefficients or setting the DCT coefficients to a particular sequence of numbers allows more efficient Huffman coding of the common sequences into shorter length number or bit sequences. According to other embodiments, the DCT coefficients can actually be removed or dropped. Block 409 retains low frequency DCT coefficients 411. For example, where the cut-off index is three DCT coefficients, three high frequency DCT coefficients 413 are filtered. Although the filter stage 407 is described as a separate unit in FIG. 4, it will be appreciated by one of skill in the art that the filter stage can be integrated into the DCT transform. According to various embodiments DCT coefficients may be filtered while the DCT transform is being applied to a particular macroblock.

Information about the number of coefficients filtered is provided to a control stage 415. This information may be derived from various criteria. Most fundamentally, the information depends upon the input bits, the desired number of output bits, and the actual output bits. The control stage 415 uses the information associated with output bits to determine one or more new cut-off indices or cut-off frequencies. The cut-off indices or cut-off frequencies may have characteristics similar to that of an ideal low pass filter. That is, any coefficients exceeding a cut frequency or cut-off index are dropped, set to zero, or set to specific sequence. Alternatively, the cut-off indices or cut-off frequencies can be designed to exhibit characteristics similar to that of a non-ideal low pass filter. Instead of dropping coefficients or setting coefficients to zero, coefficients that exceed a cut-off frequency or cut-off index can be gradually set to zero.

For example, suppose a cut-off index is two and DCT coefficients comprise number 8, 5, 5, and 6. Using the cut-off index to zero coefficients, the filtered DCT coefficients would comprise the numbers 8, 5, 0, and 0. Instead of using a strict cut-off index, a cut-off index exhibiting nonideal characteristics can be used. Using the nonideal filter, the filtered DCT coefficients would comprise the numbers 8, 5, 2, and 0. The use of a nonideal filter can make the frequency cut-off less abrupt.

It should be noted that feedback information can be provided to a control stage 415 at various points during the compression and coding process. For example feedback information can be provided after the DCT coefficient vector has been quantized. Alternatively feedback information can be provided after Huffman or arithmetic coding.

In one embodiment, rate control stage 415 uses feedback information to update rate control information. It should be noted that filter stage 407 and rate control stage 415 can comprise hardware, firmware, or software elements. Feedback can be provided at multiple points along the compression and coding stages. Feedback information can comprise many different types of information. This information is preferably obtained from previously processed (filtered) blocks of encoded content (e.g. previous macro blocks in a frame). This information may be averaged over multiple preceding blocks of content. Examples of the types of information used for feedback include reduction ratio and the cut-off index of preceding blocks.

In a particular example, the information includes the number of output bits resulting from coding or decoding of a particular macroblock. Rate control stage 415 can store information about the number of output bits versus the number of input bits for various macroblocks to determine actual reduction ratios. Average reduction ratios for a particular sequence of prior macroblocks are maintained to allow more effective adjustment of the cut-off index.

Rate control information can also comprise average cut-off indices used for prior macroblocks processed by a filter 407. The distribution of DCT coefficients themselves typically vary from macroblock to macroblock. The same cut-off index used for different macroblocks typically will result in different reduction ratios for different macroblocks.

Although the reduction ratios vary, images represented by macroblocks are often similar to the image represented by neighboring macroblocks. Consequently, it is useful to predict reduction ratios for a current macroblock using rate reduction information for past macroblocks. However, identifying how many prior macroblock reduction ratios should be considered and how much weight should be given to prior macroblock reduction ratios are important factors in setting a cut-off index for the current macroblock. For example, if past macroblocks are given too much weight, the cut-off index may not accurately reflect the local properties of the image represented by a macroblock in the neighboring macroblocks. If too little weight is given to rate control information for macroblocks not immediately neighboring the current macroblock, the cut-off index may not be stable. To determine the amount of weight to apply to rate control information for prior macroblocks, a decaying parameter and a scaling parameter are used to balance considerations of local image properties and cut-off index stability.

The techniques of the present invention use a total rate reduction ratio and the average rate reduction ratio used for prior macroblocks in order to determine the cut-off index. The total rate reduction ratio is the rate reduction ratio desired for the entire data sequence. The total rate reduction ratio can be user-defined, system specified, or even dynamically variable. A total rate reduction ratio of 0.8 would entail reducing the size of a 100 MB file to 80 MB. The total rate reduction ratio is used to determine a target rate reduction ratio for a particular macroblock.

One very specific approach that uses reduction ratios will now be described. To determine the total rate reduction ratio, the accumulated bits error is first determined by subtracting the total output bits from the total input bits multiplied by the total rate reduction ratio desired for the data.

$$B_e(n) = B_{out}(n) - R_p * B_{in}(n) \quad \text{(Equation 1)}$$

where
$B_e(n)$ is the accumulated bits error;
$B_{out}(n)$ is the total output bits;
$R_p$ is the total rate reduction ratio of the data; and
$B_{in}(n)$ is the total input bits.

The accumulated bits error is used along with the total rate reduction ratio and a spreading parameter to determine the next macroblocks target rate reduction ratio. The spreading parameter D is used to distribute the necessary rate reduction changes to a plurality of macroblocks. As will be appreciated by one of skill in the art, if the value of a spreading parameter in Equation 2 is very large, then the target rate reduction ratio will not be adjusted very rapidly. On the other hand if the value of the spreading parameter is very small, then the target rate reduction ratio for each macroblock can vary widely and cause uneven within a resulting picture. For example, if the accumulated bits error was determined to be 100 bits, 100 bits could be filtered from the next macroblock. Alternatively, using a spreading parameter of 10, 10 bits can be filtered from the next 10 macroblocks to achieve the same bit reduction. To determine the next macroblock's target rate reduction ratio, the accumulated bits error divided by the spreading parameter D is subtracted from the total rate reduction ratio.

$$R_m(n+1)=R_p(n)-(B_e(n)/D) \quad \text{(Equation 2)}$$

where $R_m(n+1)$ is the target rate reduction ratio for the next macroblock;

$R_p(n)$ is the total rate reduction ratio for the data sequence;

$B_e(n)$ is the accumulated bits error; and

D is the spreading parameter.

The average reduction ratio is the average number of output bits divided by the average number of input bits after processing a certain number of macroblocks. For example, where $\alpha$ approaches 1 in Equation 3, the average input bits and the average output bits are merely the last calculated average input and output bits values. Where $\alpha$ approaches 0, the average input and output bits values become the input and output bits values for the $n^{th}$ block.

$$R'_{avem}(n)=\Delta_{aveout}(n)/\Delta_{avein}(n) \quad \text{(Equation 3)}$$

$$\Delta_{avein}(n)=\alpha*\Delta_{avein}(n-1)+(1-\alpha)*\Delta_{in}(n)$$

$$\Delta_{aveout}(n)=\alpha*\Delta_{aveout}(n-1)+(1-\alpha)*\Delta_{out}(n)$$

where $R'_{avem}(n)$ is the average rate reduction ratio;

$\Delta_{in}(n)$ is the input bits of the $n^{th}$ macroblock;

$\Delta_{out}(n)$ is the output bits of the $n^{th}$ macroblock; and $\alpha$ is the decay factor.

The rate reduction ratio for the $n^{th}$ macroblock is the number of output bits divided by the number of input bits. For example, where the number of output bits is 80 and the number of input bits is 100, the reduction ratio is 0.8.

$$R'_m(n)=\Delta_{out}(n)/\Delta_{in}(n) \quad \text{(Equation 4)}$$

where $R'_m(n)$ is the rate reduction ratio for the $n^{th}$ macroblock;

$\Delta_{out}(n)$ is the number of output bits of the $n^{th}$ macroblock; and $\Delta_{in}(n)$ is the number of input bits of the $n^{th}$ macroblock;

One specific approach to calculating and using an average cut-off index from previous metal blocks will now be described. The average cut-off index can be determined by using the scaling parameter to adjust the current cut-off index and the past cut-off indices to provide a new average cut-off index. Where $\alpha$ approaches 1, the average cut-off is merely the average cut-off index for the prior macroblock. Where $\alpha$ approaches 0, the average cut-off index is the cut-off index for the prior macroblock.

$$I_{avec}(n)=\alpha*I_{avec}(n-1)+(1-\alpha)*I_c(n) \quad \text{(Equation 5)}$$

where $I_c(n)$ is the cut-off index for the nth macroblock; and $\alpha$ is the decay factor.

Using Equations 1–5, the current cut-off index can be derived.

$$I_c(n)=I_{avec}(n-1)-k*(R'_{avem}(n-1)-R_m(n)) \quad \text{(Equation 6)}$$

where $R_m(n)$ is the target rate reduction ratio;

$R'_{avem}(n-1)$ is derived using Equation 1;

$I_{avec}(n-1)$ is derived using Equation 3; and k is the scaling parameter.

Generally, values of $\alpha$ and k will meet the criteria: minimal error of the reduction ratio and minimal variation in the value of the cut-off index from block to block. Preferred values for the spreading parameter D, scaling parameter k, and decay parameter $\alpha$ have been empirically determined and are provided in Table 1.

TABLE 1

| D | 10 | 10 | 10 | 10 | 10 | 10 |
|---|---|---|---|---|---|---|
| $\alpha$ | .95 | .90 | .80 | .95 | .90 | .80 |
| k | 32 | 16 | 8 | 16 | 8 | 4 |

The actual determination of the parameters will be described in further detail below. It will be understood that certain parameters are preset when rate control information is unavailable. For example, when the first macroblock is being processed no average cut-off indices, average output bits, average input bits, or average rate reduction ratios may be available. Accordingly, the above parameters can be preset by a system operator.

It should also be noted that although one particular technique for using decaying parameters and scaling parameters is described, many alternative statistical techniques fall within the scope of the invention. As will be appreciated by one of skill in the art, various parameters can be used to vary the weight of past rate control information for application and determining a cut-off index.

FIG. 5 is a process flow diagram describing the techniques of the present invention, according to specific embodiments. In this specific embodiment, information is accumulated from a series of previously processed data blocks. Typically, the data blocks will be obtained from a single frame. With each mainframe, the process of FIG. 5 is restarted, in accordance with the specific embodiment. At 501, rate control information is initialized. Initialization can comprise a user specifying a particular reduction ratio for video or image data. A cut-off index can be initialized based on the desired reduction ratio. For example, if the desired reduction ratio is 20 percent, the initial cut-off index may be set to five DCT coefficients. At 503, the filter stage 407 receives a first macroblock containing DCT coefficients. This may be the first macro block in a new frame under consideration. If no rate control information is available at 505, the initial value for the cut-off index is selected at 509. No rate control information may be available because the received macroblock is the first macroblock in a frame for example. However, it should be noted that rate control information may be maintained for different images and different frames.

The information can be maintained in primary memory. If rate control information is available, then a cut-off index using rate control information can be determined at 507 using the equations noted above. At 511, the block of DCT coefficients is filtered using a cut-off index. The individual DCT coefficients can be filtered sequentially, or a variety of chip architectures can be used to filter the DCT coefficients in parallel. As one of skill in the art will appreciate, filtering may comprise ideal or nonideal filtering and contemplates mechanisms including zeroing the DCT coefficients, dropping the DCT coefficients, or setting the DCT coefficients to a particular sequence. Rate control information can then be updated at 513. Information used to update the rate control information can include feedback information for contrasting the number of output bits with the number of input bits. The value for the average cut-off index, is also updated along with average rate reduction ratios. Feedback information can be provided at various stages in coding or decoding sequence, although it will typically make less sets to provide the information when transformed coefficients are being decoded or encoded.

It should be noted that the present invention does not require that the steps of this process be performed in any specified sequence. For example, in one embodiment of the invention, the rate control information is initialized after it is determined that no rate control information is available. Similarly rate control information can be updated during various points in the process of determining the cut-off index.

FIGS. 6–20 are graphical representations showing simulation results using various bitstreams to determine rate control information parameters. The HITS and the EchoStar bitstreams were provided for simulation. The HITS bitstream used Packet Identifier (PID) 144 and 720. The EchoStar bitstream used PID 512. The HITS bitstream has no I frames, and the bit rate is 1.25 MBps and 1.92 MBps for HITS 144 and HITS 720 respectively. The EchoStar bitstream has I, P, and B frames, and the bit rate 4.41 MBps for EchoStar 512. The two bitstreams are shown in FIGS. 6 and 7.

In the EchoStar 512 bitstream simulation, total reduction ratio for each picture was set to 0.8. The spreading parameter D, decaying parameter, and scaling parameter were set to 10, 0.95, and 32 respectively. FIGS. 8 and 9 are graphical representations showing the reduction ratio result and the average cut-off index respectively. The standard deviation (STD) of the reduction ratio error was 0.0008, and the overall STD of the cut-off index was 2.1. FIG. 10 shows the cut-off index for the third frame in the EchoStar 512 video bit sequence. According to various embodiments, the optimal values for the spreading parameter, decaying parameter, and scaling parameter lead to minimal error in the reduction ratio, and minimal variation in the value of the cut-off index for different macroblocks.

FIGS. 11–13 are graphical representations showing the simulation result using a total rate reduction ratio of 0.6 and the same spreading, decaying, and scaling parameters as used above. The STD of the reduction ratio error was 0.0007, and the overall STD of the cut-off index was 1.25.

In the HITS 144 low rate simulation, the total reduction ratio of the bitstream was set to 0.8. The spreading parameters, decay parameter, and scaling parameter were set to 10, 0.95, and 32 respectively. FIGS. 14 and 15 are graphical representations showing the reduction ratio result and average cut-off indices respectively. The STD of the reduction ratio error was 0.0025 and the overall STD of the cut-off index was 4.16. FIG. 16 is a graphical representation showing the cut-off indices for frame number 10 in the HITS 144 bitstream.

FIGS. 17–19 are graphical representations showing the simulation result using a total rate reduction ratio of 0.6 and the same spreading, decaying, and scaling parameters as used in FIGS. 14–16. The STD of the reduction ratio error was 0.0055, and the overall STD of the cut-off index was 2.25. In the HITS 720 simulation, the total reduction ratio of the bitstream was set to 0.8. The spreading parameters, decay parameter, and scaling parameter were set to 10, 0.95, and 32 respectively. The STD of the reduction ratio error was 0.0035 and the overall STD of the cut-off index was 3.16.

It should be noted that simulations suggest that the rate control performance of medium or high rate bitstreams is better than that of low rate bitstreams in that both reduction ratio errors and cut-off index variation are reduced. Simulations using the following were performed to determine preferred combinations of spreading, decaying, and scaling parameters:

HITS 144, HITS 720, and EchoStar 512 bitstreams;

Total reduction ratios of 0.8 and 0.6;

Spreading parameters 10, 20, 30, and 40;

Decaying parameters 0.8, 0.9, and 0.95; and

Scaling parameters 32, 16, 8, and 4.

Figure 21:
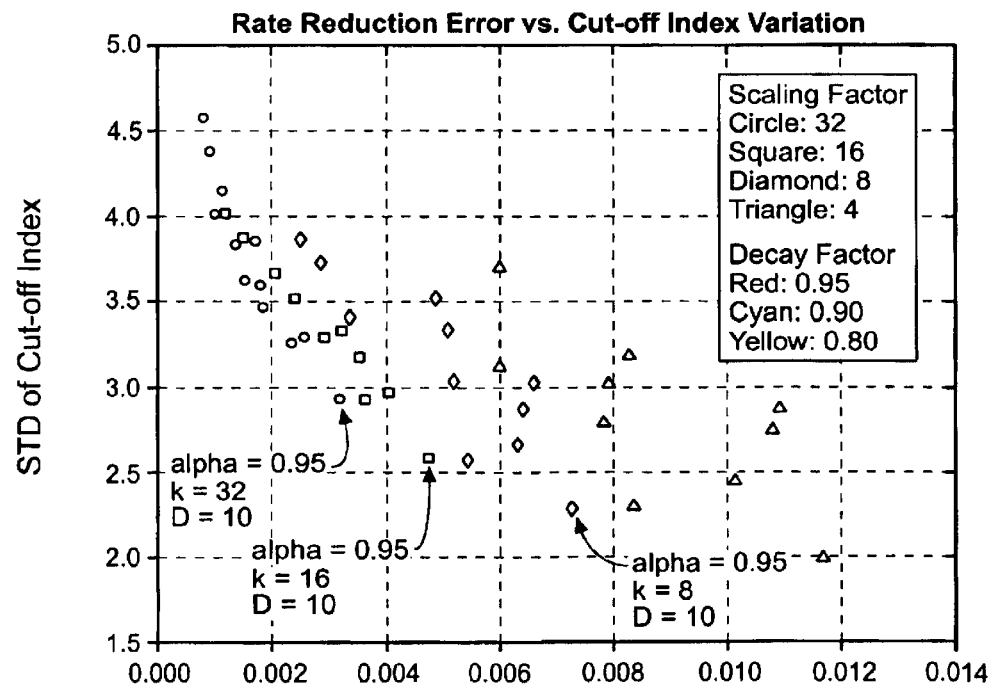

Simulation results are graphically represented in FIGS. 20, and 21. According to specific embodiments, optimal combinations limit the STD of rate reduction error and the STD of the cut-off indices.

The present invention for filtering transform coefficients to provide rate reduction in a bitstream can be implemented in various network systems. In various embodiments, this is implemented in the headend of a high bandwidth networks such as a cable network or a satellite network. In the context of a cable network, the invention may be implemented in a standalone system, such as Cisco 6920 RateMux® available from Cisco Systems, Inc, or in a line card of a cable modem headend such as the Cisco UBR 7200 also available from Cisco Systems, Inc.

FIG. 22 depicts the basic components of a cable modem headend that can be used to implement the present invention, according to specific embodiments. Although the techniques of the present invention can be integrated into a cable modem headend, the present invention can also be used in a standalone system. FIG. 22 shows an implementation using the cable modem headend.

A Data Network Interface 2202 is an interface component between an external data source and the cable system. External data sources transmit data to data network interface 2202 via optical fiber, microwave link, satellite link, or through various other media. Also as mentioned above, a Media Access Control Block (MAC Block) 2204 receives data packets from a Data Network Interface 2202 and encapsulates them with a MAC header.

In a specific embodiment as shown in FIG. 22, CMTS 205 provides functions on three network layers including a physical layer 2232, a Media Access Control (MAC) layer 2230, and a network layer 2234. Generally, the physical layer is responsible for receiving and transmitting RF signals on the cable plant. Hardware portions of the physical layer include a downstream modulator and transmitter 2206 and an upstream demodulator and receiver 2214. The physical layer also includes software 2286 for driving the hardware components of the physical layer.

Once an information packet is demodulated by the demodulator/receiver 2214, it is then passed to MAC layer 2230. A primary purpose of MAC layer 2230 is to encapsulate and decapsulate packets within a MAC header, preferably according to the above-mentioned DOCSIS standard for transmission of data or other information.

MAC layer 2230 includes a MAC hardware portion 2204 and a MAC software portion 2284, which function together to encapsulate information packets with the appropriate MAC address of the cable modem(s) on the system. After the upstream information has been processed by MAC layer 2230, it is then passed to network layer 2234. Network layer 2234 includes switching software 2282 for causing the upstream information packet to be switched to an appropriate data network interface on data network interface 2202.

When a packet is received at the data network interface 2202 from an external source, the switching software within network layer 2234 passes the packet to MAC layer 2230. MAC block 2204 transmits information via a one-way communication medium to downstream modulator and transmitter 2206. Downstream modulator and transmitter 2206 takes the data (or other information) in a packet structure and converts it to modulated downstream frames, such as MPEG or ATM frames, on the downstream carrier using, for example, QAM 224 modulation (other methods of modulation can be used such as CDMA (Code Division Multiple Access) OFDM (Orthogonal Frequency Division Multiplexing), FSK (FREQ Shift Keying)). The return data is likewise modulated using, for example, QAM 16 or QSPK. Data from other services (e.g. television) is added at a combiner 2207. Converter 2208 converts the modulated RF electrical signals to optical signals that can be received and transmitted by a Fiber Node 2210 to the cable modem hub.

It is to be noted that alternate embodiments of the CMTS (not shown) may not include network layer 2234. In such embodiments, a CMTS device may include only a physical layer and a MAC layer, which are responsible for modifying a packet according to the appropriate standard for transmission of information over a cable modem network. The network layer 2234 of these alternate embodiments of CMTS devices may be included, for example, as part of a conventional router for a packet-switched network.

In a specific embodiment, the network layer of the CMTS is configured as a cable line card coupled to a standard router that includes the physical layer 2232 and MAC layer 2230. The techniques of the present invention including a filter stage and rate control stage shown in FIG. 1 can be implemented on a line card. Using this type of configuration, the CMTS is able to send and/or receive IP packets to and from the data network interface 2202 using switching software block 2282. The data network interface 2202 is an interface component between external data sources and the cable system. The external data sources transmit data to the data network interface 2202 via, for example, optical fiber, microwave link, satellite link, or through various media. The data network interface includes hardware and software for interfacing to various networks such as, for example, Ethernet, ATM, frame relay, etc.

As shown in FIG. 22, the CMTS includes a hardware block 2250 including one or more processors 2255 and memory 2257. These hardware components interact with software and other hardware portions of the various layers within the CMTS. Memory 2257 may include, for example, I/O memory (e.g. buffers), program memory, shared memory, etc. Hardware block 2250 may physically reside with the other CMTS components.

In one embodiment, the software entities 2282, 2284, and 2286 are implemented as part of a network operating system running on hardware 2250. Further, the provisions of this invention for providing quality of service for multicast streams are preferably implemented in software as part of the operating system.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using firmware, software, or hardware. Moreover, embodiments of the present invention may be employed with a variety of communication protocols and should not be restricted to the ones mentioned above. For example, the headend has a variety of embodiments, which include a cable modem termination system coupled to a router or a multicast router. A cable modem can also be a separate entity or entirely integrated into a client system. In addition and as mentioned above, the invention may be implemented in both differential and single-ended configurations. Therefore, the scope of the invention should be determined with reference to the appended claims.

What is claimed is:

1. A method of reducing the bit rate of a video bitstream to meet bandwidth constraints, the method comprising:
   identifying transform coefficients representing video content in a frame or a portion of frame of the video bitstream;
   identifying a cut-off index using rate control information, wherein the rate control information comprises an average reduction ratio and a current reduction ratio, the cut-off index calculated by using the average reduction ratio and the current reduction ratio; and
   filtering selected transform coefficients from the video bitstream by using the cut-off index to thereby reduce the bit rate of the video bitstream.

2. The method of claim 1, wherein the transform coefficients are discrete cosine transform coefficients.

3. The method of claim 1, wherein the transform coefficients selected for filtering are selected based upon their impact on human vision.

4. The method of claim 1, wherein the transform coefficients selected for filtering are selected based upon frequency considerations.

5. The method of claim 4, wherein transform coefficients representing high frequency components of the video content are selected for filtering.

6. A method for determining a cut-off index for a plurality of transform coefficients, the method comprising:
   identifying a plurality of transform coefficients associated with a macroblock;

identifying a cut-off index using rate control information, wherein the rate control information comprises a current reduction ratio for the macroblock, the current reduction ratio for the macroblock calculated by considering the number of outputs bits for the macroblock and the number of input bits for the macroblock;

filtering the plurality of transform coefficients using the cut-off index to provide modified transform coefficients; and adjusting the rate control information using information associated with transform coefficients and the modified transform coefficients.

7. The method of claim 6, wherein the transform coefficients are DCT coefficients.

8. The method of claim 6, wherein the transform coefficients are associated with a block.

9. The method of claim 8, wherein the block is 8×8 pixels.

10. The method of claim 6, wherein the cut-off index is a cut-off frequency.

11. The method of claim 10, wherein the cut-off frequency is associated with a low pass filter.

12. The method of claim 11, wherein the low pass filter is an ideal low pass filter.

13. The method of claim 6, wherein the rate control information further comprises a total reduction ratio, an average reduction ratio, and an average cut-off index.

14. The method of claim 6, wherein the rate control information further comprises a decay factor, a spreading factor, and a scaling parameter.

15. The method of claim 13, wherein the current reduction ratio is calculated using the equation:

$$R'_m(n) = \Delta_{out}(n) / \Delta_{in}(n)$$

where $\Delta_{out}(n)$ is the number of output bits of the $n^{th}$ macroblock; and $\Delta_{in}(n)$ is the number of input bits of the $n^{th}$ macroblock.

16. The method of claim 13, wherein the average reduction ratio is calculated using the equations:

$$R'_{avem}(n) = \Delta_{aveout}(n) / \Delta_{avein}(n)$$

$$\Delta_{avein}(n) = \alpha * \Delta_{avein}(n-1) + (1-\alpha) * \Delta_{in}(n)$$

$$\Delta_{aveout}(n) = \alpha * \Delta_{aveout}(n-1) + (1-\alpha) * \Delta_{out}(n)$$

where $\Delta_{in}(n)$ is the input bits of the $n^{th}$ macroblock;

$\Delta_{out}(n)$ is the output bits of the $n^{th}$ macroblock; and $\alpha$ is a decay factor.

17. The method of claim 13, wherein the cut-off index is calculated using the equation:

$$I_c(n) = I_{avec}(n-1) - k * (R'_{avem}(n-1) - R_m(n))$$

where k is a scaling factor.

18. The method of claim 13, wherein the average cut-off index is calculated using the equation:

$$I_{avec}(n) = \alpha * I_{avec}(n-1) + (1-\alpha) * I_c(n)$$

where $I_c(n)$ is the cut-off index for the nth macroblock; and $\alpha$ is a decay factor.

19. The method of claim 18, wherein the decay factor is between 0.8 and 0.9.

20. An apparatus for filtering transform coefficients to provide modified transform coefficients, the apparatus comprising:

a filter stage for receiving transform coefficients associated with a macroblock, the filter stage associated with a cut-off index, wherein the filter stage selectively filters transform coefficients using the cut-off index; and a rate control stage coupled to the output of the filter stage, the rate control stage providing feedback to the filter stage for adjusting the cut-off index using rate control information, wherein the rate control information comprises an average reduction ratio across a plurality of macroblocks, the average reduction ratio for the plurality of macroblocks calculated by considering the average number of outputs bits for the plurality of macroblocks and the average number of input bits for the plurality of macroblocks.

21. The apparatus of claim 20, wherein the coefficients are DCT coefficients.

22. The apparatus of claim 20, wherein transform coefficients are associated with a block.

23. The apparatus of claim 22, wherein the block is 8×8 pixels.

24. The apparatus of claim 20, wherein the filter stage is a low pass filter.

25. The apparatus of claim 24, wherein the filter is an ideal low pass filter.

26. The apparatus of claim 20, wherein the rate control stage maintains rate control information for the transform coefficients.

27. The apparatus of claim 20, wherein the rate control information further comprises a total reduction ratio, a current reduction ratio, and an average cut-off index.

28. The apparatus of claim 27, wherein the rate control information further comprises a decay factor, a spreading factor, and a scaling parameter.

29. The apparatus of claim 27, wherein the current reduction ratio is calculated using the equation:

$$R'_m(n) = \Delta_{out}(n) / \Delta_{in}(n)$$

where $\Delta_{out}(n)$ is the number of output bits of the $n^{th}$ macroblock; and $\Delta_{in}(n)$ is the number of input bits of the $n^{th}$ macroblock.

30. The apparatus of claim 27, wherein the average reduction ratio is calculated using the equations:

$$R'_{avem}(n) = \Delta_{aveout}(n) / \Delta_{avein}(n)$$

$$\Delta_{avein}(n) = \alpha * \Delta_{avein}(n-1) + (1-\alpha) * \Delta_{in}(n)$$

$$\Delta_{aveout}(n) = \alpha * \Delta_{aveout}(n-1) + (1-\alpha) * \Delta_{out}(n)$$

where $\Delta_{in}(n)$ is the input bits of the $n^{th}$ macroblock;

$\Delta out(n)$ is the output bits of the $n^{th}$ macroblock; and $\alpha$ is a decay factor.

31. The apparatus of claim 27, wherein the cut-off index is calculated using the equation:

$$I_c(n) = I_{avec}(n-1) - k * (R'_{avem}(n-1) - R_m(n))$$

where k is a scaling factor.

32. The apparatus of claim 27, wherein the average cut-off index is calculated using the equation:

$$I_{avec}(n)=\alpha*I_{avec}(n-1)+(1-\alpha)*I_c(n)$$

where $I_c(n)$ is the cut-off index for the nth macroblock; and $\alpha$ is a decay factor.

33. The apparatus of claim 31, wherein the decay factor is between 0.8 and 0.9.

34. The apparatus of claim 27, wherein the total reduction ratio is predetermined.

35. An apparatus for filtering transform coefficients to provide modified transform coefficients, the apparatus comprising:

filter means for receiving transform coefficients associated with a macroblock, the filter means associated with a cut-off index, wherein the filter means selectively filters transform coefficients using the cut-off index; and rate control means coupled to the output of the filter means, the rate control means providing feedback to the filter means for adjusting the cut-off index using rate control information, wherein the rate control information comprises an average cut-off index, the average cut-off index calculated by using a plurality of cut-off indices for a plurality of macroblocks.

36. The apparatus of claim 35, wherein the coefficients are DCT coefficients.

37. The apparatus of claim 35, wherein transform coefficients are block.

38. The apparatus of claim 37, wherein the block is 8×8 pixels.

39. The apparatus of claim 35, wherein the filter means is a low pass filter.

40. The apparatus of claim 39, wherein the filter is an ideal low pass filters.

41. The apparatus of claim 35, wherein the rate control means maintains rate control information for the transform coefficients.

42. The apparatus of claim 35, wherein the rate control information further comprises a total reduction ratio, an average reduction ratio, and a current reduction ratio.

43. The apparatus of claim 42, wherein the rate control information further comprises a decay factor, a spreading factor, and a scaling parameter.

44. The apparatus of claim 42, wherein the current reduction ratio is calculated using the equation:

$$R'_m(n)=\Delta_{out}(n)/\Delta_{in}(n)$$

where $\Delta_{out}(n)$ is the number of output bits of the $n^{th}$ macroblock; and $\Delta_{in}(n)$ is the number of input bits of the $n^{th}$ macroblock.

45. The apparatus of claim 42, wherein the average reduction ratio is calculated using the equations:

$$R'_{avem}(n)=\Delta_{aveout}(n)/\Delta_{avein}(n)$$

$$\Delta_{avein}(n)=\alpha*\Delta_{avein}(n-1)+(1-\alpha)*\Delta_{in}(n)$$

$$\Delta_{aveout}(n)=\alpha*\Delta_{aveout}(n-1)+(1-\alpha)*\Delta_{out}(n)$$

where $\Delta_{in}(n)$ is the input bits of the $n^{th}$ macroblock;

$\Delta_{out}(n)$ is the output bits of the $n^{th}$ macroblock; and $\alpha$ is a decay factor.

46. The apparatus of claim 42, wherein the cut-off index is calculated using the equation:

$$I_c(n)=I_{avec}(n-1)-k*(R'_{avem}(n-1)-R_m(n))$$

where k is a scaling factor.

47. The apparatus of claim 42, wherein the average cut-off index is calculated using the equation:

$$I_{avec}(n)=\alpha*I_{avec}(n-1)+(1-\alpha)*I_c(n)$$

where $I_c(n)$ is the cut-off index for the nth macroblock; and $\alpha$ is a decay factor.

48. The apparatus of claim 47, wherein the decay factor is between 0.8 and 0.9.

49. The apparatus of claim 42, wherein the total reduction ratio is predetermined.

50. A computer readable medium comprising computer code for reducing the bit rate of a video bitstream to meet bandwidth constraints, the computer readable medium comprising:

computer code for identifying transform coefficients representing video content in a frame or a portion of frame of the video bitstream;

computer code for identifying a cut-off index using rate control information, wherein the rate control information comprises an average reduction ratio and a current reduction ratio, the cut-off index calculated by using the average reduction ratio and the current reduction ratio; and computer code for filtering selected transform coefficients from the video bitstream by using a cut-off index to thereby reduce the bit rate of the video bitstream.

51. The computer readable medium of claim 50, wherein the transform coefficients are DCT coefficients.

52. The computer readable medium of claim 50, wherein the transform coefficients are associated with a block.

53. The computer readable medium of claim 52, wherein the block is 8×8 pixels.

54. The computer readable medium of claim 50, wherein the cut-off index is a cut-off frequency.

55. The computer readable medium of claim 54, wherein the cut-off frequency is associated with a low pass filter.

56. The computer readable medium of claim 55, wherein the low pass filter is an ideal low pass filter.

57. The apparatus of claim 50, wherein the rate control information further comprises a total reduction ratio, and an average cut-off index.

58. The computer readable medium of claim 50, wherein the rate control information further comprises a decay factor, a spreading factor, and a scaling parameter.

59. The computer readable medium of claim 57, wherein the current reduction ratio is calculated using the equation:

$$R'_m(n)=\Delta_{out}(n)/\Delta_{in}(n)$$

where $\Delta_{out}(n)$ is the number of output bits of the $n^{th}$ macroblock; and $\Delta_{in}(n)$ is the number of input bits of the $n^{th}$ macroblock.

60. The computer readable medium of claim 57, wherein the average reduction ratio is calculated using the equations:

$$R'_{avem}(n)=\Delta_{aveout}(n)/\Delta_{avein}(n)$$

$$\Delta_{avein}(n)=\alpha*\Delta_{avein}(n-1)+(1-\alpha)*\Delta_{in}(n)$$

$$\Delta_{aveout}(n)=\alpha*\Delta_{aveout}(n-1)+(1-\alpha)*\Delta_{out}(n)$$

where
- $\Delta_{in}(n)$ is the input bits of the $n^{th}$ macroblock;
- $\Delta_{out}(n)$ is the output bits of the $n^{th}$ macroblock; and
- $\alpha$ is a decay factor.

61. The computer readable medium of claim 57, wherein the cut-off index is calculated using the equation:

$$I_c(n)=I_{avec}(n-1)-k*(R'_{avem}(n-1)-R_m(n))$$

where
- k is a scaling factor.

62. The computer readable medium of claim 57, wherein the average cut-off index is calculated using the equation:

$$I_{avec}(n)=\alpha*I_{avec}(n-1)+(1-\alpha)*I_c(n)$$

where
- $I_c(n)$ is the cut-off index for the nth macroblock; and
- $\alpha$ is a decay factor.

63. The computer readable medium of claim 62, wherein the decay factor is between 0.8 and 0.9.

* * * * *